(12) United States Patent
Dai et al.

(10) Patent No.: US 12,550,113 B2
(45) Date of Patent: Feb. 10, 2026

(54) CONFIGURATION AND MEASUREMENT ENHANCEMENTS FOR DOUBLE-SIDED ROUND TRIP TIME

(71) Applicant: QUALCOMM Incorporated, San Diego, CA (US)

(72) Inventors: Jing Dai, Beijing (CN); Alexandros Manolakos, Escondido, CA (US); Sony Akkarakaran, Poway, CA (US); Srinivas Yerramalli, San Diego, CA (US); Guttorm Ringstad Opshaug, Redwood City, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 18/277,372

(22) PCT Filed: Apr. 30, 2021

(86) PCT No.: PCT/CN2021/091586
§ 371 (c)(1),
(2) Date: Aug. 15, 2023

(87) PCT Pub. No.: WO2022/227030
PCT Pub. Date: Nov. 3, 2022

(65) Prior Publication Data
US 2024/0155550 A1 May 9, 2024

(51) Int. Cl.
*H04W 64/00* (2009.01)
*H04L 5/00* (2006.01)
*H04W 56/00* (2009.01)

(52) U.S. Cl.
CPC ......... *H04W 64/006* (2013.01); *H04L 5/0051* (2013.01); *H04W 56/009* (2013.01)

(58) Field of Classification Search
CPC .... G01S 13/762; G01S 13/765; G01S 13/878; G01S 5/0205; G01S 5/021; G01S 5/0236;
(Continued)

(56) References Cited

U.S. PATENT DOCUMENTS

| 10,939,401 | B2 | 3/2021 | Sadiq et al. |
| 2020/0205104 | A1* | 6/2020 | Akkarakaran ......... H04W 8/24 |
| 2022/0252690 | A1* | 8/2022 | Zhou .................. H04W 56/004 |

FOREIGN PATENT DOCUMENTS

| WO | 2017196067 A1 | 11/2017 |
| WO | 2020013987 A1 | 1/2020 |
| WO | 2021058852 A1 | 4/2021 |

OTHER PUBLICATIONS

Intel Corporation "Mitigation of UE RX/TX and gNB RX/TX Timing Errors", 3GPP TSG RAN WG1 #104bis-e, R1-2103035, e-Meeting, Apr. 12-20, 2021, Apr. 7, 2021, pp. 1-14, Sections 1-2.
(Continued)

*Primary Examiner* — Timothy X Pham
(74) *Attorney, Agent, or Firm* — QUALCOMM Incorporated

(57) ABSTRACT

A UE receives, from a BS, information indicating a first TEG delay at the BS for a transmission of a first PRS, a second TEG delay at the BS for a reception of an SRS from the UE, a third TEG delay at the BS for a transmission of a second PRS, a fourth TEG delay at the BS for a transmission of the first PRS and a reception of the SRS from the UE, or a fifth TEG delay at the BS for a reception of the SRS from the UE and a transmission of the second PRS, or any combination thereof. The UE determines a double RTT based on a first PRS timing associated with a reception of the first PRS, an SRS timing associated with a transmission of the SRS, a second PRS timing associated with a reception of the second PRS, and the received information.

30 Claims, 22 Drawing Sheets

(58) Field of Classification Search
CPC .... G01S 7/006; H04L 5/0051; H04W 56/009; H04W 64/006
See application file for complete search history.

(56) References Cited

OTHER PUBLICATIONS

International Search Report and Written Opinion—PCT/CN2021/091586—ISA/EPO—Jan. 26, 2022.
Qualcomm Incorporated: "Enhancements on Timing Error Mitigations for Improved Accuracy", 3GPP TSG RAN WG1 #104b-e, R1-2103170, e-Meeting, Apr. 12-20, 2021, Apr. 7, 2021 (Apr. 7, 2021) Sections 2.1, 2.3.1, 4.2, pp. 1-20, the whole document.

* cited by examiner

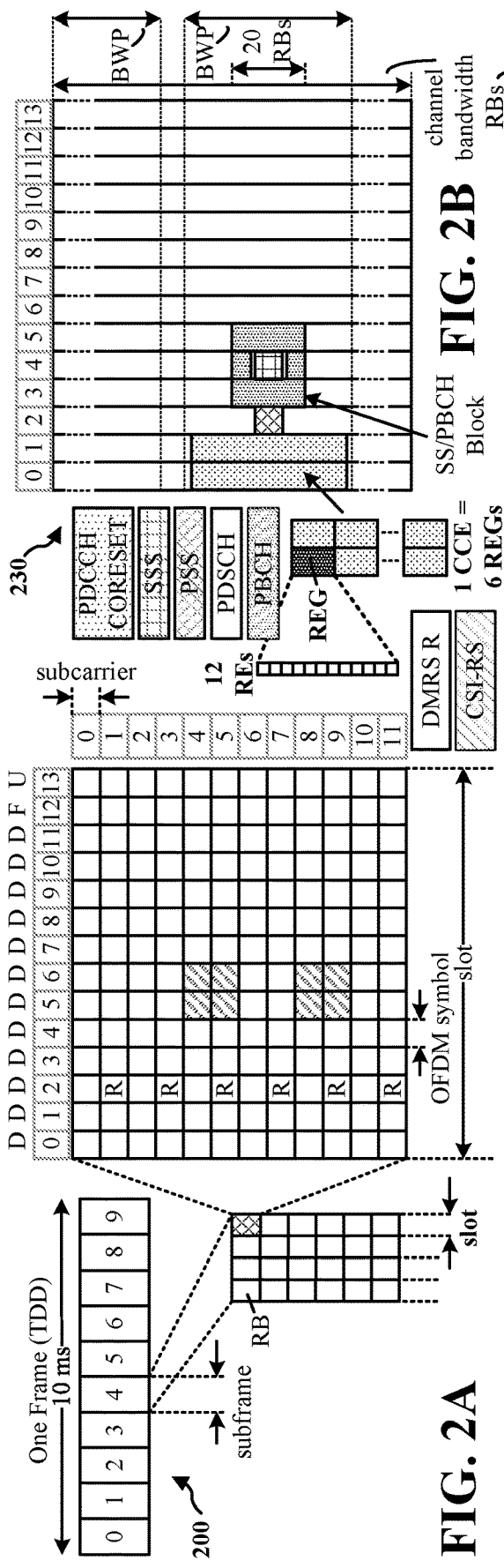
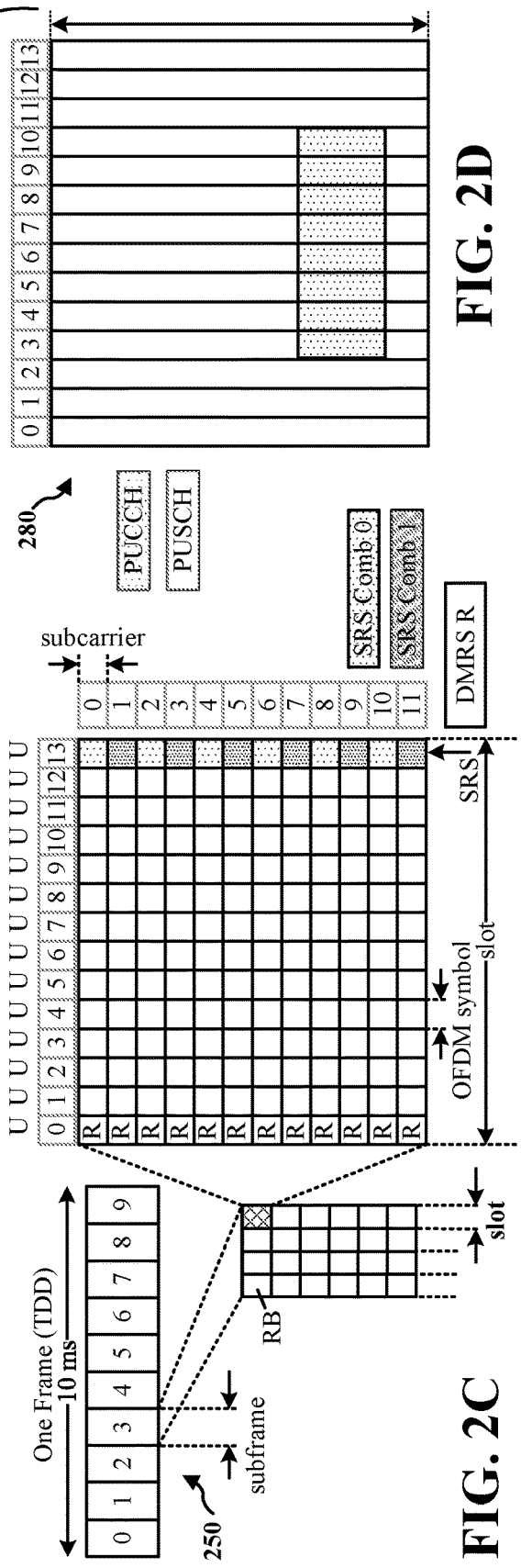
FIG. 2A
FIG. 2B
FIG. 2C
FIG. 2D

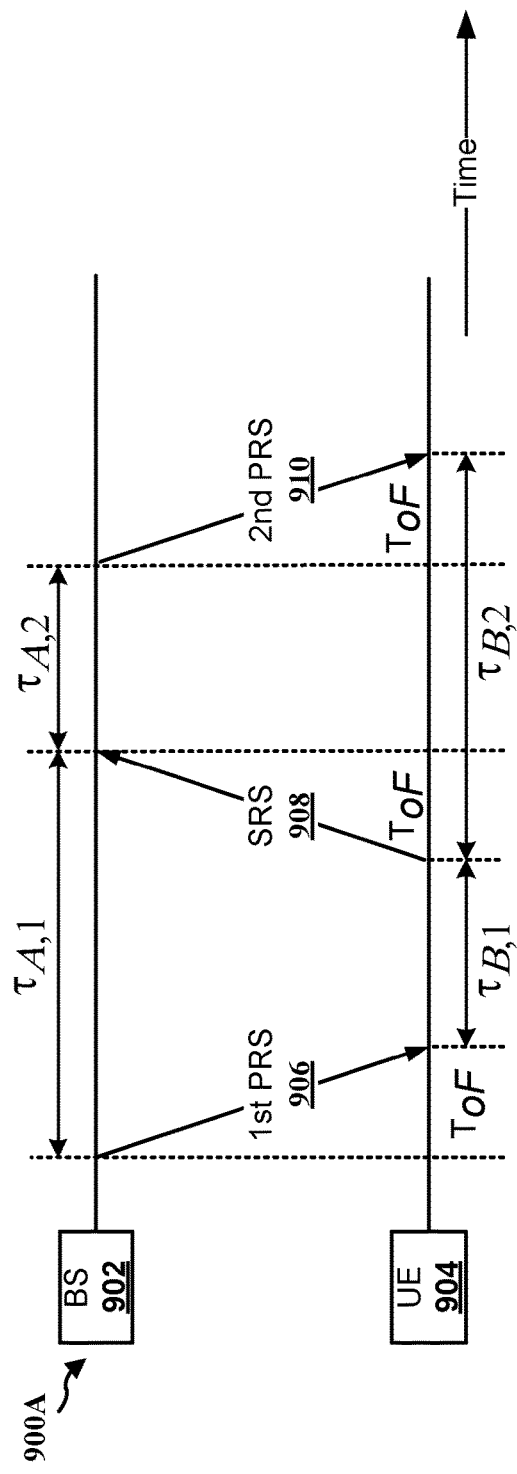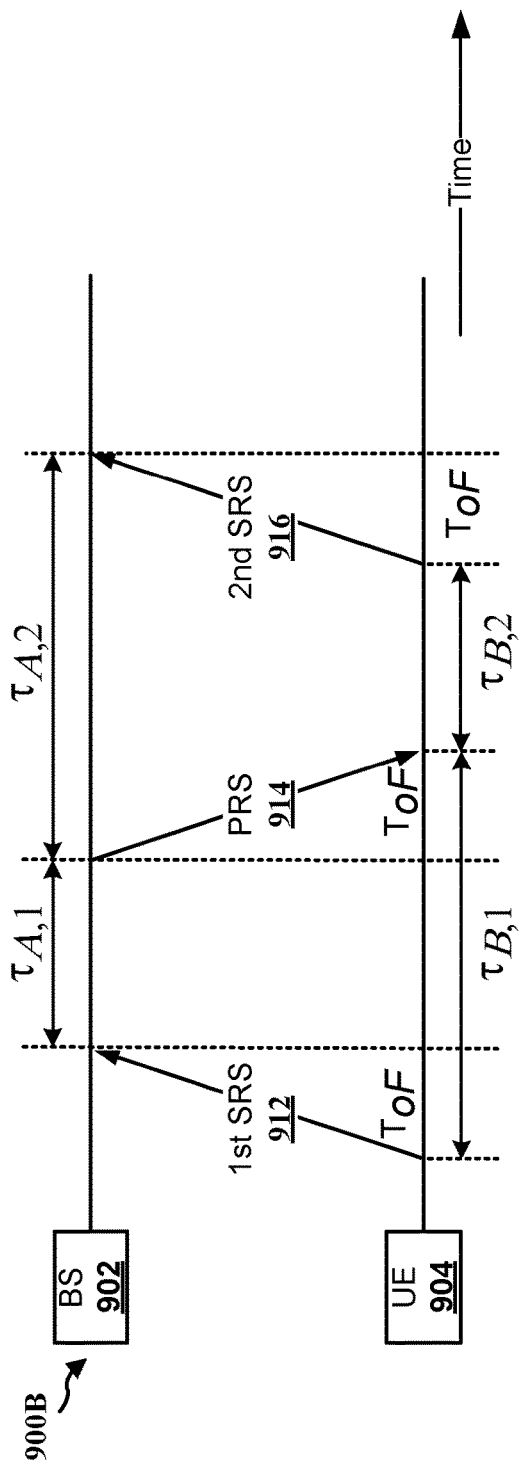

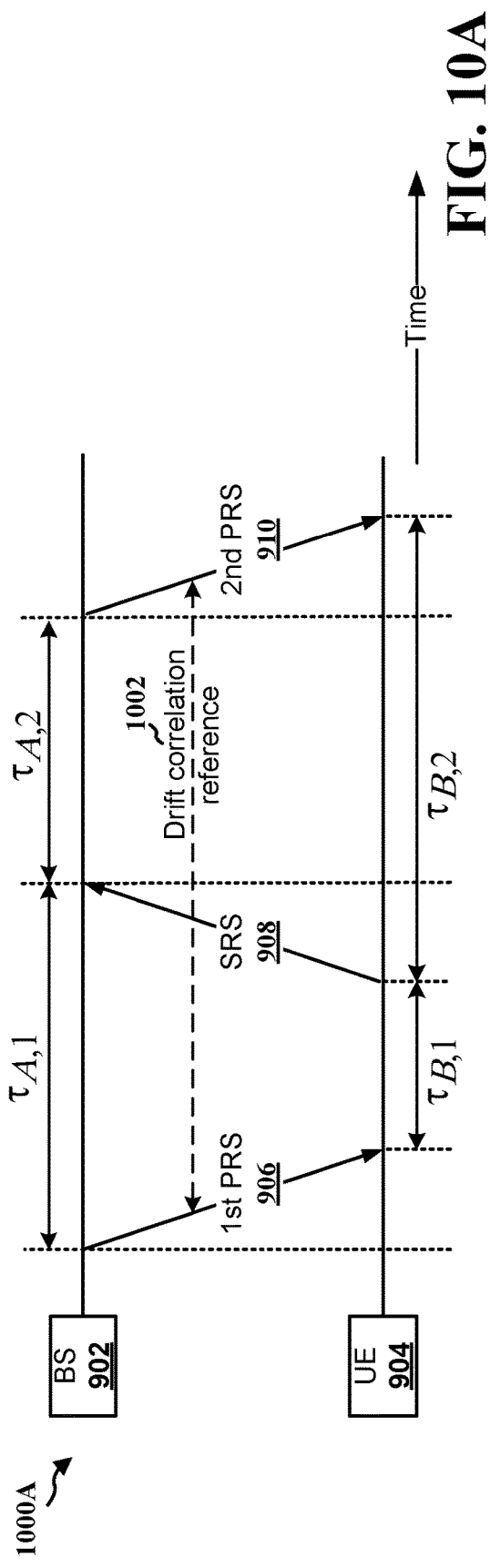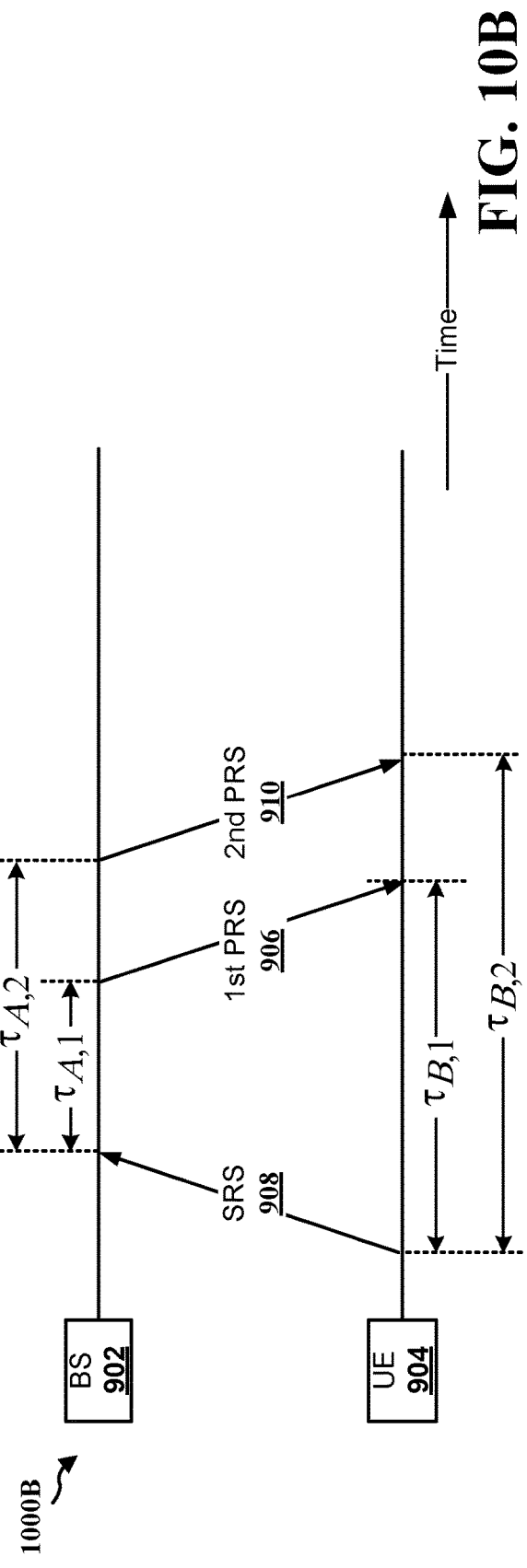

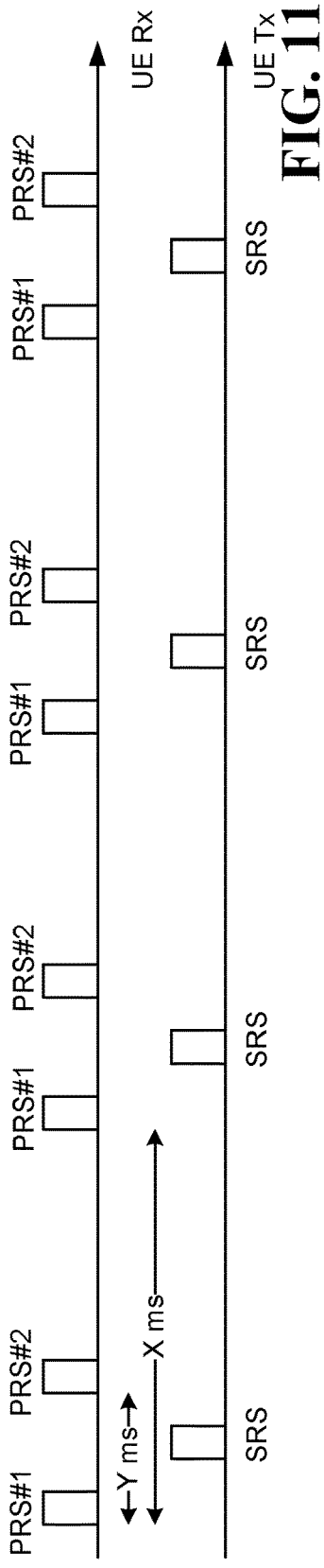
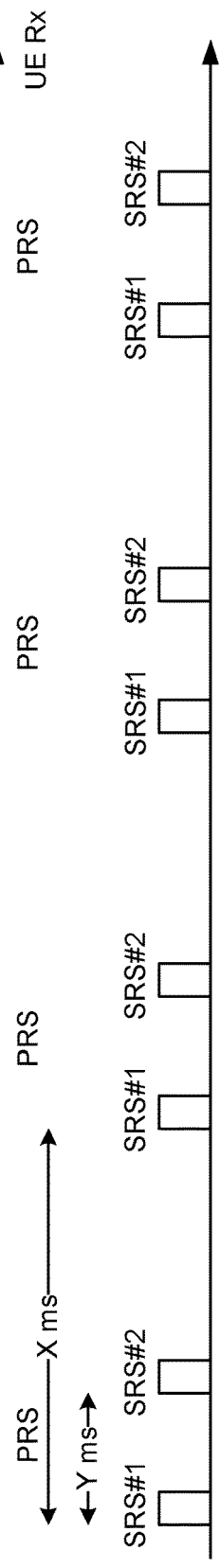
FIG. 11A
FIG. 11B

1802: Receive, from a BS, information indicating a first TEG delay at the BS for a transmission of a first PRS, a second TEG delay at the BS for a reception of an SRS from the UE, a third TEG delay at the BS for a transmission of a second PRS, a fourth TEG delay at the BS for a reception of the first PRS and a reception of the SRS from the UE, or a fifth TEG delay at the BS for a reception of the second PRS, or any combination thereof

↓

1804: Receive, from the BS, the first PRS and the second PRS

↓

1806: Transmit, to the BS, the SRS

↓

1808: Receive, from the BS, first BS time difference measurement information associated with the first PRS and the SRS, and second BS time difference measurement information associated with the second PRS and the SRS - the double RTT is determined further based on the received first BS time difference measurement information and the received second BS time difference measurement information

↓

1809: Determine first UE time difference measurement information associated with the first PRS timing and the SRS timing, and determine second UE time difference measurement information associated with the second PRS timing and the SRS timing - the double RTT is determined further based on the first UE time difference measurement information and the second UE time difference measurement information.

↓

1810: Determine a double RTT based on a first PRS timing associated with a reception of the first PRS, an SRS timing associated with a transmission of the SRS, a second PRS timing associated with a reception of the second PRS, and the received information

↓

1812: Receive a configuration for an SRS transmission window for transmitting the SRS, the SRS transmission window having a center approximately between the first PRS and the second PRS - the SRS is transmitted based on the received configuration for the SRS transmission window

CONFIGURATION AND MEASUREMENT ENHANCEMENTS FOR DOUBLE-SIDED ROUND TRIP TIME

CROSS REFERENCE TO RELATED APPLICATION(S)

This application is a National Stage Application filed under 35 U.S.C. § 371 of PCT International Application Serial No. PCT/CN2021/091586 entitled "CONFIGURATION AND MEASUREMENT ENHANCEMENTS FOR DOUBLE-SIDED ROUND TRIP TIME" and filed on Apr. 30, 2021, which is expressly incorporated by reference herein in its entirety.

TECHNICAL FIELD

The present disclosure relates generally to communication systems, and more particularly, to wireless communication involving ranging and positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives, from a base station (BS), information indicating a first timing error group (TEG) delay at the BS for a transmission of a first positioning reference signal (PRS), a second TEG delay at the BS for a reception of a sounding reference signal (SRS) from the UE, a third TEG delay at the BS for a transmission of a second PRS, a fourth TEG delay at the BS for a transmission of the first PRS and a reception of the SRS from the LIE, or a fifth TEG delay at the BS for a reception of the SRS from the UE and a transmission of the second PRS, or any combination thereof. The apparatus receives, from the BS, the first PRS and the second PRS. The apparatus transmits, to the BS, the SRS. The apparatus determines a double round trip time (RTT) based on a first PRS timing associated with a reception of the first PRS, an SRS timing associated with a transmission of the SRS, a second PRS timing associated with a reception of the second PRS, and the received information.

In an aspect of the disclosure, a method, a computer-readable medium, and an apparatus are provided for wireless communication at a UE. The apparatus receives, from a BS, information indicating a first TEG delay at the BS for a reception of a first SRS, a second TEG delay at the BS for a transmission of a PRS to the UE, a third TEG delay at the BS for a reception of a second SRS, a fourth TEG delay at the BS for a reception of the first SRS and a transmission of the PRS to the UE, or a fifth TEG delay at the BS for a transmission of the PRS to the UE and a reception of the second SRS, or any combination thereof. The apparatus receives, from the BS, the PRS. The apparatus transmits, to the BS, the first SRS and the second SRS. The apparatus determines a double RTT based on a first SRS timing associated with a transmission of the first SRS, a PRS timing associated with a reception of the PRS, a second SRS timing associated with a transmission of the second SRS, and the received information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 9A and 9B are diagrams illustrating examples of double-side RTT in accordance with various aspects of the present disclosure.

FIGS. 10A and 10B are diagrams illustrating examples of double-side RTT in accordance with various aspects of the present disclosure.

FIG. 11A is a diagram illustrating an example of batch reporting for paired PRSs and one SRS in accordance with various aspects of the present disclosure.

FIG. 11B is a diagram illustrating an example of batch reporting for one SRS and paired PRSs in accordance with various aspects of the present disclosure.

FIG. 18 is a flowchart of a method of wireless communication in accordance with aspects presented herein.

DETAILED DESCRIPTION

Figure 1:
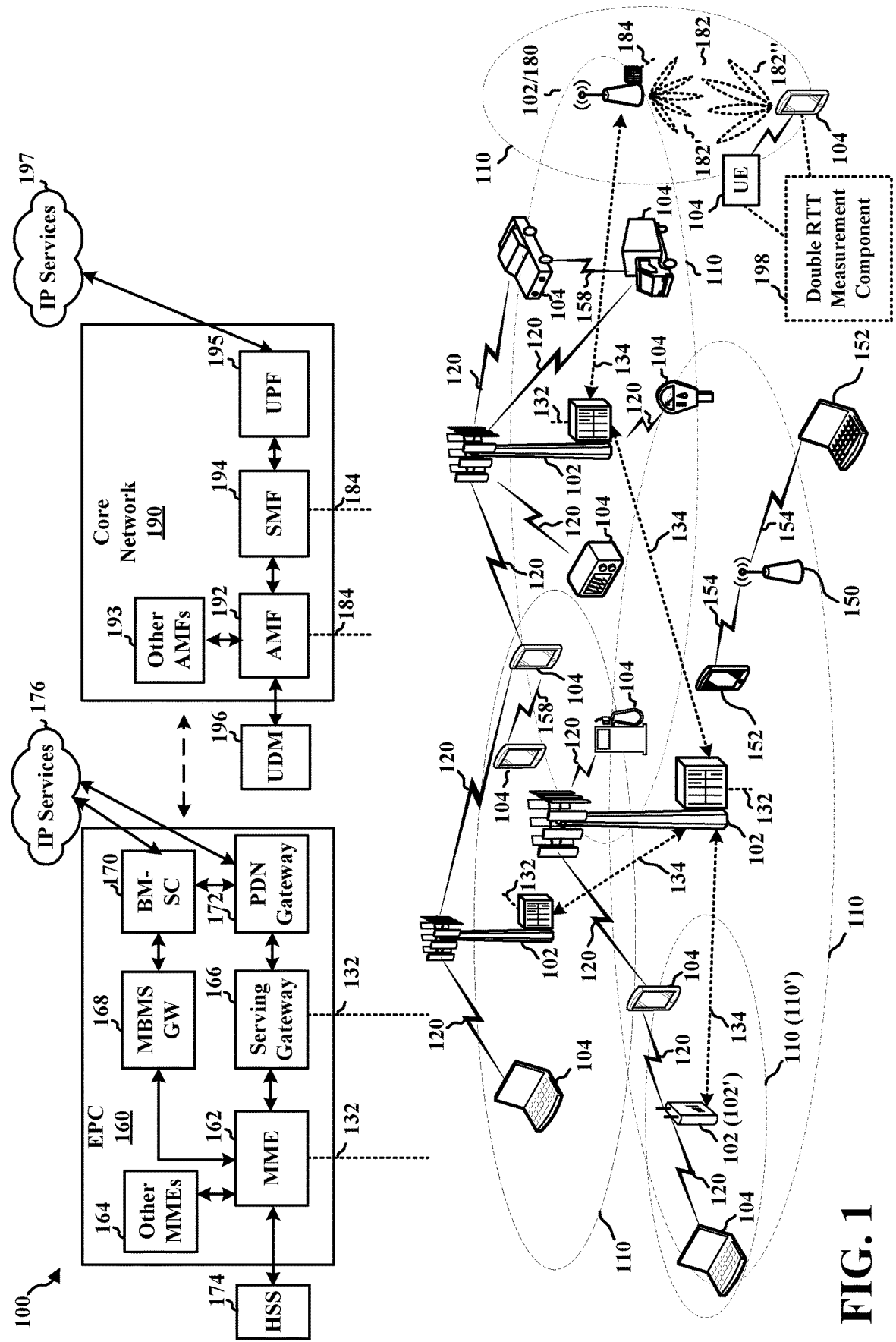
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may improve the efficiency and accuracy of RTT measurement. Aspects presented herein may enable a wireless device, such as a UE or a base station, to determine/measure RTT(s) between one or more pairs of PRS and SRS more accurately by including one or more TEG delays associated with transmission and/or reception of PRS/SRS in the RTT determination/measurement. As such, aspects presented herein may improve positioning accuracy by mitigating UE Rx/Tx and/or gNB Rx/Tx timing delays (e.g., group delays).

In certain aspects, the UE 104 may include a double RTT measurement component 198 configured to determine/measure RTT(s) between one or more pairs of PRS and SRS. In one configuration, the double RTT measurement component 198 may be configured to receive, from a BS, information indicating a first TEG delay at the BS for a transmission of a first PRS, a second TEG delay at the BS for a reception of an SRS from the UE, a third TEG delay at the BS for a transmission of a second PRS, a fourth TEG delay at the BS for a transmission of the first PRS and a reception of the SRS from the UE, or a fifth TEG delay at the BS for a reception of the SRS from the UE and a transmission of the second PRS, or any combination thereof. In such configuration, the double RTT measurement component 198 may receive, from the BS, the first PRS and the second PRS. In such configuration, the double RTT measurement component 198 may transmit, to the BS, the SRS. In such configuration, the double RTT measurement component 198 may determine a double RTT based on a first PRS timing associated with a reception of the first PRS, an SRS timing associated with a transmission of the SRS, a second PRS timing associated with a reception of the second PRS, and the received information.

In another configuration, the double RTT measurement component 198 may be configured to receive, from a BS, information indicating a first TEG delay at the BS for a reception of a first SRS, a second TEG delay at the BS for a transmission of a PRS to the UE, a third TEG delay at the BS for a reception of a second SRS, a fourth TEG delay at the BS for a reception of the first SRS and a transmission of the PRS to the UE, or a fifth TEG delay at the BS for a transmission of the PRS to the UE and a reception of the second SRS, or any combination thereof. In such configuration, the double RTT measurement component 198 may receive, from the BS, the PRS. In such configuration, the double RTT measurement component 198 may transmit, to the BS, the first SRS and the second SRS. In such configuration, the double RTT measurement component 198 may determine a double RTT based on a first SRS timing associated with a transmission of the first SRS, a PRS timing associated with a reception of the PRS, a second SRS timing associated with a transmission of the second SRS, and the received information.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSCCH), a physical sidelink shared channel (PSCCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHZ). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the LIE 104 may each include a plurality of antennas, such as antenna elements, antenna panels, and/or antenna arrays to facilitate the beamforming.

The base station 180 may transmit a beamformed signal to the UE 104 in one or more transmit directions 182'. The HE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/HE 104 may perform beam training to determine the best receive and transmit directions for each of the base station 180/UE 104. The transmit and receive directions for the base station 180 may or may not be the same. The transmit and receive directions for the HE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides HE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia. Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a HE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the HE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PDSCH). The PDSCH DM-RS may be transmitted in the first one or two symbols of the PDSCH. The PUCCH DM-RS may be transmitted in different configurations depending on whether short or long PUCCHs are transmitted and depending on the particular PUCCH format used. The HE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HAW)) ACK/NACK feedback. The PUSCH carries data, and may additionally be used to carry a buffer status report (BSR), a power headroom report (PHR), and/or UCI.

Figure 3:
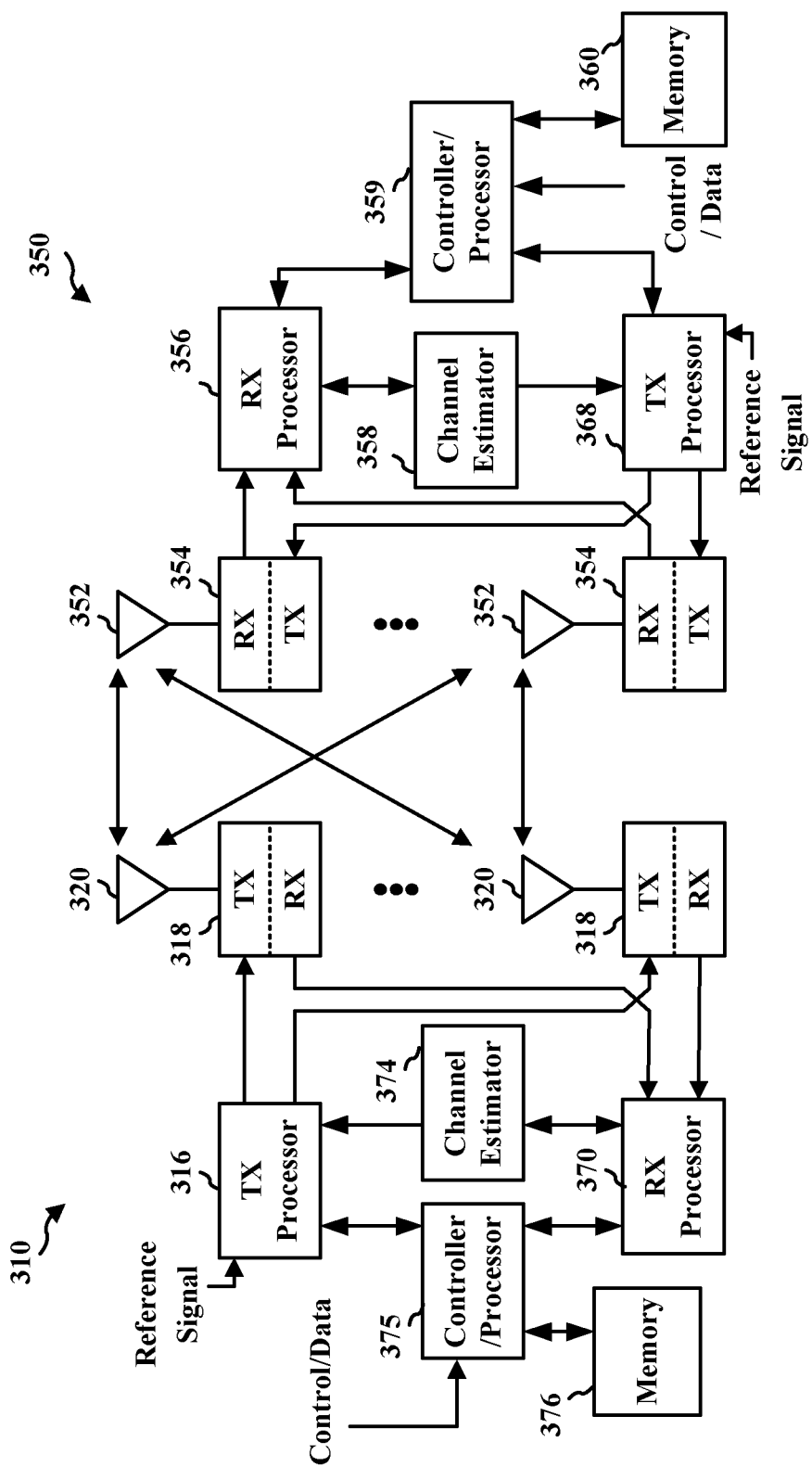
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BP SK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization. Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the info enation to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the double RTT measurement component 198 of FIG. 1.

Figure 4:
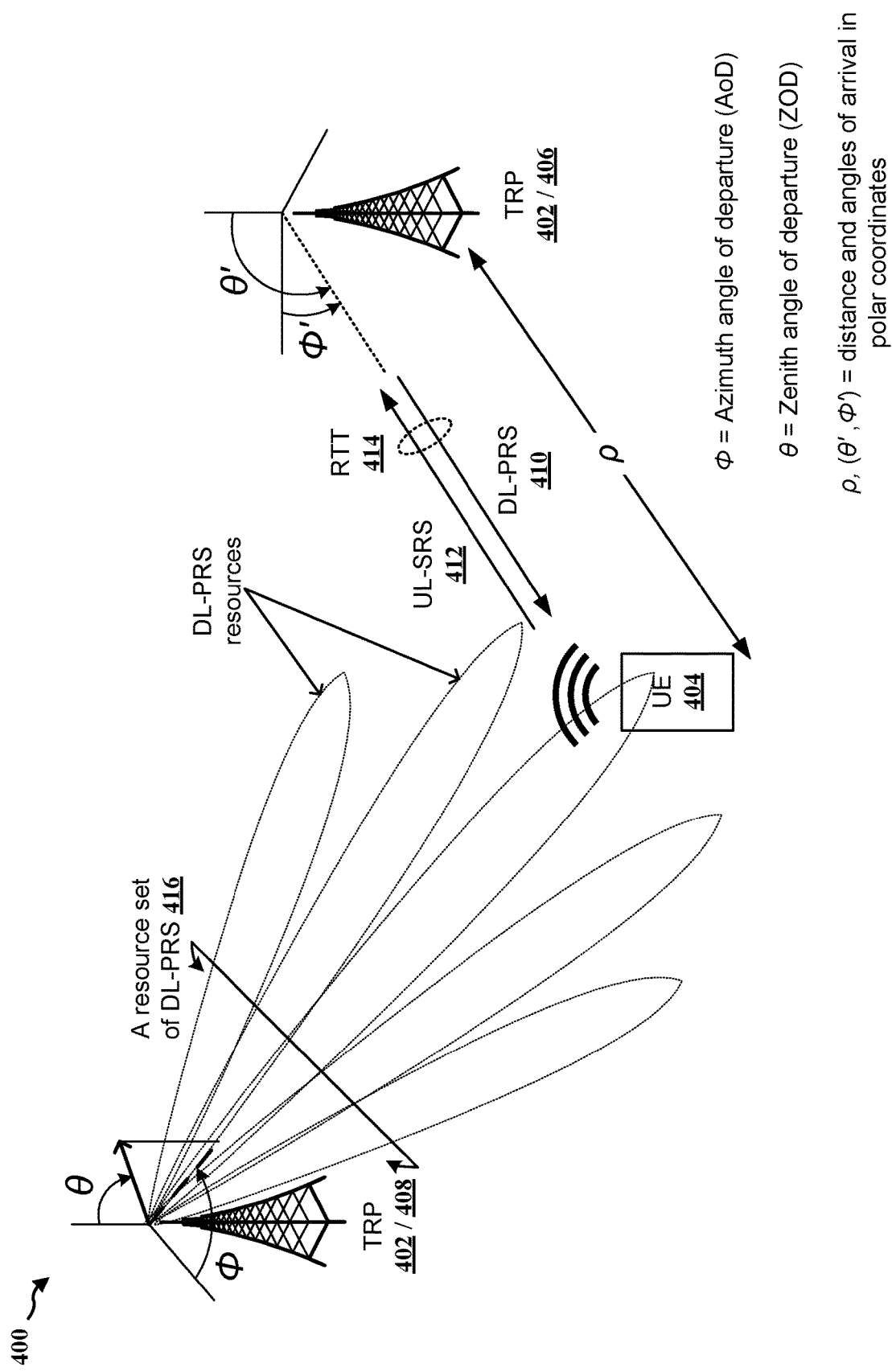
FIG. 4 is a diagram illustrating an example of a UE positioning based on reference signal measurements in accordance with various aspect of the present disclosure.

A UE's position may be estimated based on measuring reference signals transmitted between the UE and one or more base stations and/or transmission reception points (TRPs). FIG. 4 is a diagram 400 illustrating an example of a UE positioning based on reference signal measurements. In one example, a UE 404's location may be estimated based on multi-cell round trip time (multi-RTT) measurements, where multiple TRPs 402 may perform round trip time (RTT) measurements for signals transmitted to and received from the UE 404 to determine the UE 404's approximate distance with respect to each of the multiple TRPs 402. Similarly, the UE 404 may perform RTT measurements for signals transmitted to and received from the TRPs 402 to determine each TRP's approximate distance with respect to the UE 404. Then, based at least in part on the UE 404's approximate distances with the multiple TRPs 402, a base station and/or the UE 404 may estimate the UE 404's position. For example, a TRP 406 may transmit at least one downlink positioning reference signal (DL-PRS) 410 to the UE 404, and may receive at least one uplink sounding reference signal (UL-SRS) 412 transmitted from the UE 404. Based at least in part on measuring an RTT 414 between the DL-PRS 410 transmitted and the UL-SRS 412 received, the TRP 406 may identify the UE 404's position (e.g., distance) with respect to the TRP 406. Similarly, the UE 404 may transmit UL-SRS 412 to the TRP 406, and may receive DL-PRS 410 transmitted from the TRP 406. Based at least in part on measuring the RTT 414 between the UL-SRS 412 transmitted and the DL-PRS 410 received, the UE 404 may identify the TRP 406's position with respect to the HE 404. The multi-RTT measurement mechanism may be initiated by a location management function (LMF) that is associated with a base station. A base station may configure UL-SRS resources to a UE via radio resource control (RRC) signaling. In some examples, the UE and the base station (e.g., TRPs of the base station) may report the multi-RTT measurements to the LMF, and the LW may estimate the UE's position based on the reported multi-RTT measurements.

In other examples, a UE's position may be estimated based on multiple antenna beam measurements, where a downlink angle of departure (DL-AoD) and/or an uplink angle of arrival (UL-AoA) of transmissions between a HE and one or more base stations/TRPs may be used to estimate the UE's position and/or the UE's distance with respect to each base station/TRP. For example, referring back to FIG. 4, with regard to the DL-AoD, the UE 404 may perform reference signal received power (RSRP) measurements for a set of DL-PRS 416 transmitted from multiple transmitting beams (e.g., DL-PRS beams) of a TRP 408, and the UE 404 may provide the DL-PRS beam measurements to a base station (e.g., to the LMF associated with the base station). Based on the DL-PRS beam measurements, the base station may derive the azimuth angle (e.g., Φ) of departure and the zenith angle (e.g., θ) of departure for DL-PRS beams of the TRP 408. Then, the base station may estimate the UE 404's position with respect to the TRP 408 based on the azimuth angle of departure and the zenith angle of departure of the DL-PRS beams. Similarly, for the UL-AOA, a UE's position may be estimated based on UL-SRS beam measurements measured at different TRPs, such as at the TRPs 402. Based on the UL-SRS beam measurements, the base station may derive the azimuth angle of arrival and the zenith angle of arrival for UL-SRS beams from the UE, and the base station may estimate the UE's position and/or the UE distance with respect to each of the TRPs based on the azimuth angle of arrival and the zenith angle of arrival of the UL-SRS beams.

Figure 5:
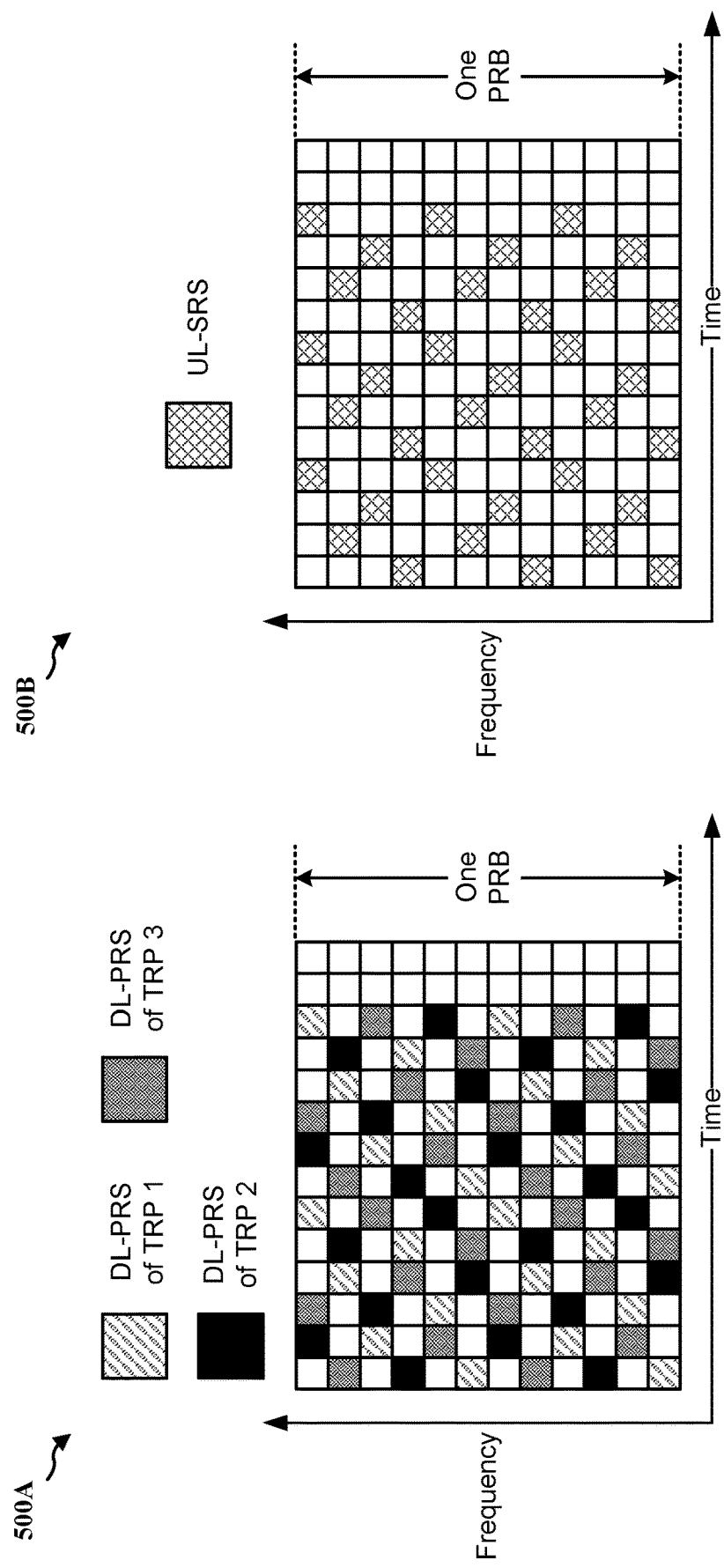
FIGS. 5A and 5B are diagrams illustrating examples of DL-PRS transmitted from multiple TRPs and UL-SRS transmitted from a UE in accordance with various aspect of the present disclosure.

FIG. 5A is a diagram 500A illustrating an example of DL-PRS transmitted from multiple TRPs. In one example, a base station may configure DL-PRS to be transmitted from one or more TRPs within a slot or across multiple slots. If the DL-PRS is configured to be transmitted within a slot, the base station may configure the starting resource element in time and frequency from each of the one or more TRPs. If the DL-PRS is configured to be transmitted across multiple slots, the base station may configure gaps between DL-PRS slots, periodicity of the DL-PRS, and/or density of the DL-PRS within a period. The base station may also configure the DL-PRS to start at any physical resource block (PRB) in the system bandwidth. In one example, the system bandwidth may range from 24 to 276 PRBs in steps of 4 PRBs (e.g., 24, 28, 32, 36, etc.). The base station may transmit the DL-PRS in PRS beams, where a PRS beam may be referred to as a "PRS resource" and a full set of PRS beams transmitted from a TRP on a same frequency may be referred to as a "PRS resource set" or a "resource set of PRS," such as described in connection with FIG. 4. As shown by FIG. 5A, the DL-PRS transmitted from different TRPS and/or from different PRS beams may be multiplexed across symbols or slots. Each symbol of the DL-PRS may be configured with a comb-structure in frequency, where the DL-PRS from a base station or a TRP may occupy every $N^{th}$ subcarrier. The comb value N may be configured to be 2, 4, 6, or 12. The length of the PRS within one slot may be a multiple of N symbols and the position of the first symbol within a slot may be flexible as long as the slot consists of at least N PRS symbols. The diagram 500A is an example of a comb-6 DL-PRS configuration, where the pattern for the DL-PRS from different TRPs may be repeated after six (6) symbols.

FIG. 5B is a diagram 500B illustrating an example of UL-SRS transmitted from a UE. In one example, the UL-SRS from a UE may be configured with a comb-4 pattern, where the pattern for UL-SRS may be repeated after four (4) symbols. Similarly, the UL-SRS may be configured in an SRS resource of an SRS resource set, where each SRS resource may correspond to an SRS beam, and the SRS resource sets may correspond to a collection of SRS resources (e.g., beams) configured for a base station/TRP. In some examples, the SRS resources may span 1, 2, 4, 8, or 12 consecutive OFDM symbols. In other examples, the comb size for the UL-SRS may be configured to be 2, 4, or 8.

After a wireless device, such as a UE or a base station, transmits SRS/PRS and receives PRS/SRS, the wireless device may perform various measurements based on the transmitted and/or the received signals. For example, the wireless device may measure reference signal receive power (RSRP) for a received signal, reception (Rx) and transmission (Tx) time difference between a transmitted signal and a received signal, relative time of arrival (RTOA) of a received signal, and/or reference signal time difference (RSTD) between signals, etc. Then, the wireless device may report the measurement(s) to one or more entities that are associated with the positioning session of the wireless device, such as a location management function (LMF), a base station and/or another wireless device, etc.

Figure 6:
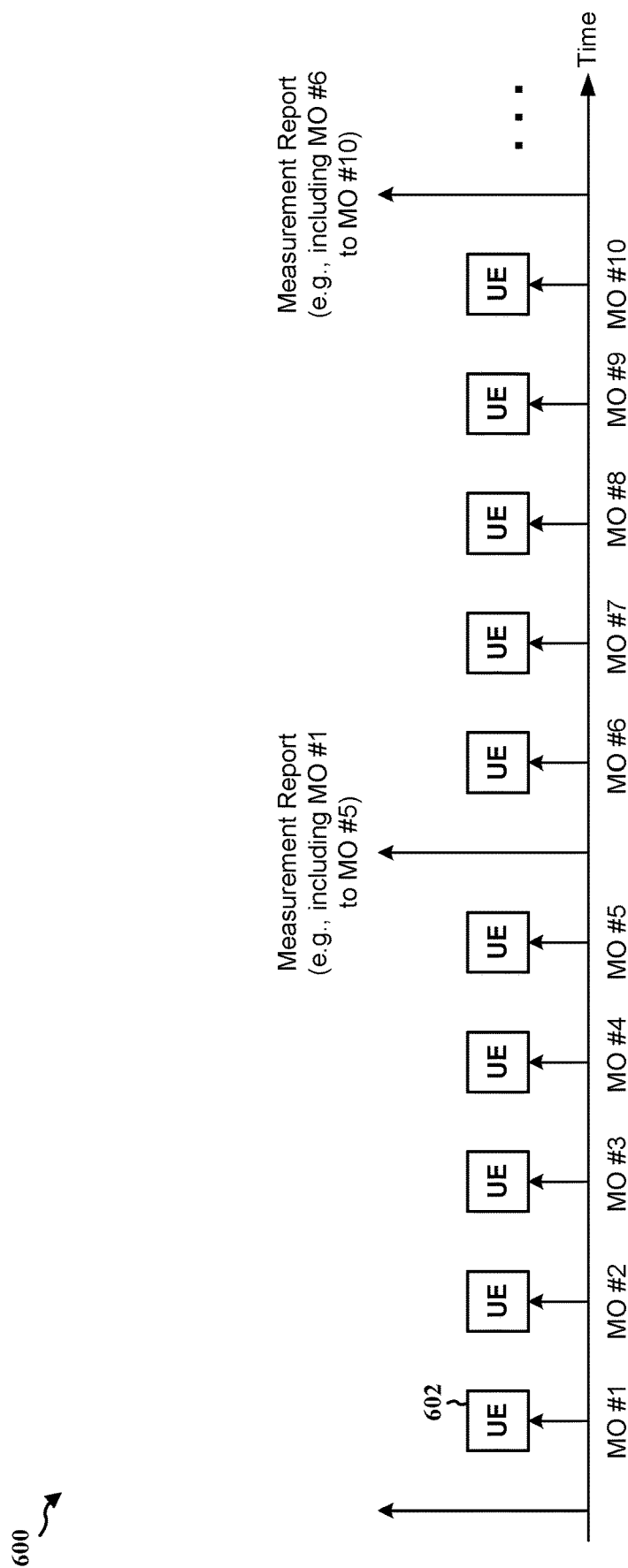
FIG. 6 is a diagram illustrating an example of batch reporting in accordance with various aspects of the present disclosure.

In some examples, to reduce signaling overhead between two wireless devices, such as between UEs or between a UE and a base station, a transmitting device may be configured to report multiple measurements in one measurement report, which may be referred to as "batch reporting." FIG. 6 is a diagram 600 illustrating an example of batch reporting. A UE 602 may be configured to perform multiple measurements for reference signals received from another device (e.g., another UE or a base station) in multiple measurement occasions (MOs), and the UE 602 may report the multiple measurements in one measurement report. For example, the UE 602 may perform PRS measurements at five measurement occasions (e.g., MO #1 to MO #5) at a specified periodicity, and then the LIE 602 may transmit the PRS measurements obtained during the five measurement occasions to a base station or an LMF in one measurement report. In other words, the UE 602 may be configured or scheduled to measure DL-PRS transmitted from a base station with a measurement occasion every X ms, and the UE 602 may also be scheduled to send with PRS report with a periodicity of K*X ms, etc. As such, the reporting of the positioning measurements (from the UE and the gNB) may be enhanced, which may enable multiple measurement reporting in a single report with timestamps derived on the same TRP and PRS resources. For example, a UE may report one or more measurement instances (of RSTD, DL RSRP, and/or UE Rx-Tx time difference measurements) in a single measurement report to LMF for UE-assisted positioning, and/or a TRP (or a base station) may report one or more measurement instances (of RTOA, UL RSRP, and/or base station Rx-Tx time difference measurements) in a single measurement report to LMF, etc. This may facilitate UE and base station time-alignment of reported measurements for DL and UL (multi-RTT) positioning, and/or reporting of multiple measurements across time to tackle time-drift/UE-motion.

In some examples, physical and/or electrical constraints in a wireless device, such as a user equipment (UE) or a base station/TRP, may introduce timing errors associated with the transmission and/or reception of a reference signal. For example, when a transmitting device transmits a signal, there may be a time delay from the time when a digital signal is generated at a baseband to the time when the RF signal is transmitted from the Tx antenna. For supporting positioning, a UE and/or a TRP may implement an internal calibration/compensation of the Tx time delay for the transmission of the DL PRS/UL SRS signals, which may also include the calibration/compensation of the relative time delay between different RF chains in the same TRP and/or UE. The compensation may also possibly consider the offset of the Tx antenna phase center to the physical antenna center. However, the calibration may not be perfect. The remaining Tx time delay after the calibration, or the uncalibrated Tx time delay may be defined as a "Tx timing error."

Similarly, when a receiving device receives a signal, from a signal reception perspective, there may be a time delay from the time when an RF signal arrives at the Rx antenna to the time when the signal is digitized and time-stamped at the baseband. For supporting positioning, a HE and/or a TRP may implement an internal calibration/compensation of the Rx time delay before it reports the measurements that are obtained from the DL PRS/UL SRS signals, which may also include the calibration/compensation of the relative time delay between different RF chains in the same TRY/UE. The compensation may also possibly consider the offset of the Rx antenna phase center to the physical antenna center. However, the calibration may not be perfect. The remaining Rx time delay after the calibration, or the uncalibrated Rx time delay may be defined as an "Rx timing error."

Figure 7:
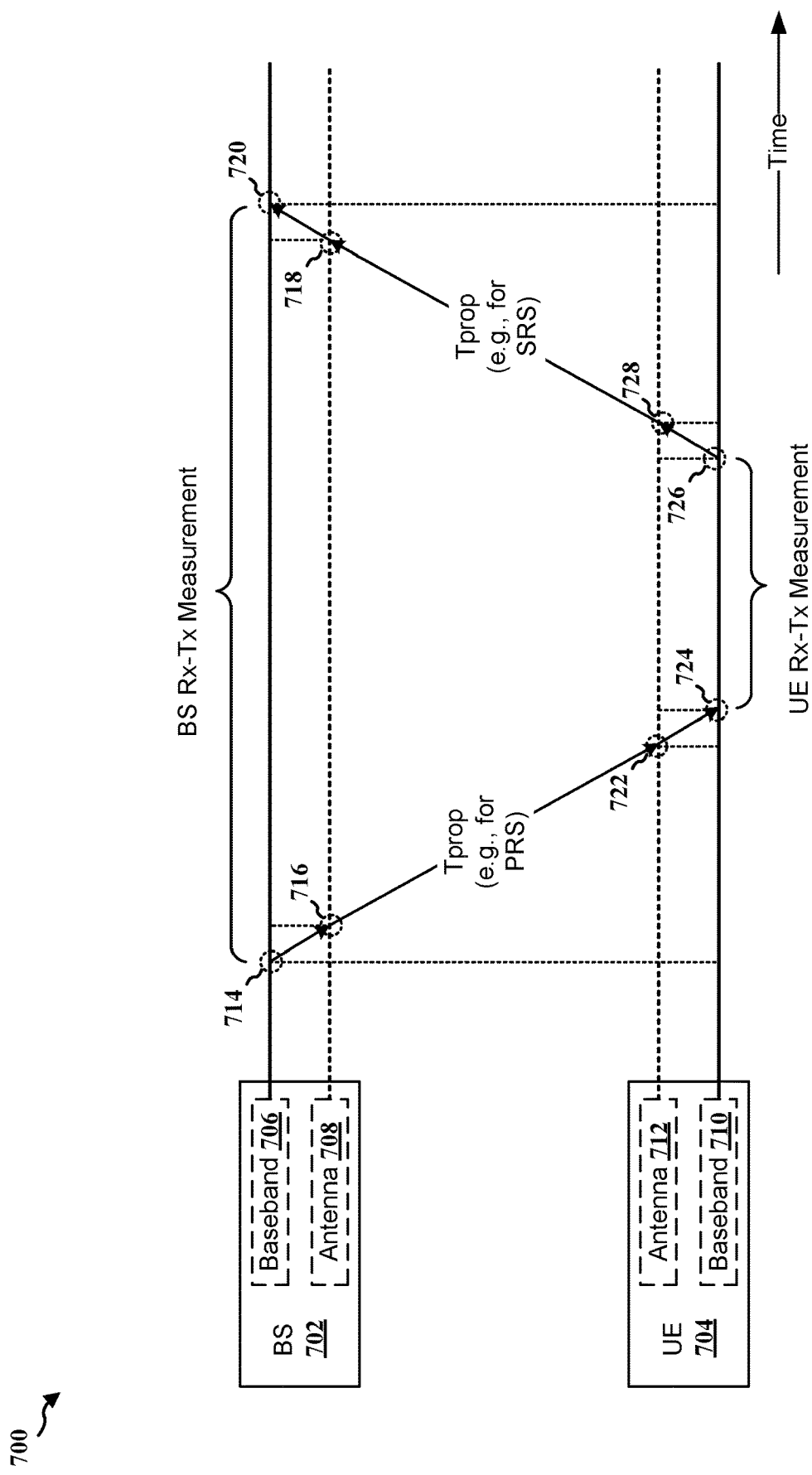
FIG. 7 is a diagram illustrating an example of time delay for transmitting and receiving a signal in accordance with various aspects of the present disclosure.

FIG. 7 is a diagram 700 illustrating an example of time delay for transmitting and receiving a signal. A base station 702 may include a baseband 706 and an antenna 708. When the base station 702 transmits a signal (e.g., a PRS) to a UE 704, there may be a time delay from the time when the signal is generated at the baseband 706 (e.g., as shown at 714) to the time when the signal is transmitted from the antenna 708 (e.g., as shown at 716). When the base station 702 receives a signal (e.g., an SRS) transmitted from the UE 704, there may be a time delay from the time when the signal arrives at the antenna 708 (e.g., as shown at 718) to the time when the signal is digitized and time-stamped at the baseband 706 (e.g., as shown at 720). Similarly, the UE 704 may include a baseband 710 and an antenna 712. When the UE 704 receives a signal (e.g., a PRS) transmitted from the base station 702, there may be a time delay from the time when the signal arrives at the antenna 712 (e.g., as shown at 722) to the time when the signal is digitized and time-stamped at the baseband 710 (e.g., as shown at 724). When the UE 704 transmits a signal (e.g., an SRS) to the base station 702, there may be a time delay from the time when the signal is generated at the baseband 710 (e.g., as shown at 726) to the time when the signal is transmitted from the antenna 712 (e.g., as shown at 728). In some examples, the time delay(s) between the baseband and the antenna may cause the base station 702 and/or the UE 704's Rx-Tx measurements between transmitted signals and received signals to be inaccurate, which may reduce the accuracy of the positioning. While the timing delay may be compensated/calibrated, the compensation/calibration may not be perfect and may result in Rx timing error and/or Tx timing error. In some examples, an Rx timing error, a Tx timing error, or a combination of both the Rx timing error and Tx timing error as small as 100 nanoseconds may result in a localization error of 30 meters.

In some examples, and for purposes of the present disclosure, the Rx timing error(s) and/or the Tx timing error(s) may be associated with a timing error group (TEG). For example, a "UE Tx TEG" may be associated with the transmissions of one or more UL SRS resources for positioning purposes, which may have the Tx timing error(s) within a certain margin. A "TRP Tx TEG" may be associated with the transmissions of one or more DL PRS resources, which may have the Tx timing error(s) within a certain margin. A "UE Rx TEG" may be associated with one or more DL measurements, which may have the Rx timing error(s) within a certain margin. A "TRP Rx TEG" may be associated with one or more UL measurements, which may have the Rx timing error(s) within a margin. A "UE RxTx TEG" or "UE TxRx TEG" may be associated with one or more LIE Rx-Tx time difference measurements, and one or more UL SRS resources for positioning purposes, which may have the 'Rx timing error(s) plus (±) Tx timing error(s)' within a certain margin. A "TRP RxTx TEG" or "TRP TxRx TEG" may be associated with one or more base station Rx-Tx time difference measurements and one or more DL PRS resources, which may have the 'Rx timing error(s) plus (+) Tx timing error(s)' within a certain margin.

In some examples, each TEG corresponding to a timing delay may be associated with a TEG identifier (ID). For example, a TEG ID=1 may be associated with a first timing delay, and a UE RxTx TEG ID=2 may be associated with a second timing delay that is different from the first timing delay. As such, multiple TEGs may be identified with different TEG identification values (e.g., TEG #1, TEG #2, TEG #3, etc.) and may be associated with delay times within established margins. For example, a first TEG (e.g., TEG #1) may include delay times in a first range, a second TEG (e.g., TEG #2) may include delay times in a second range, and a third TEG (e.g., TEG #3) may include delay times in a third range, etc. In some example, the first range, the second range, and the third range may represent uncertainties around a mean delay time for each respective TEG. For example, the first TEG may have a first mean delay value, the second TEG may have a second mean delay value, and the third TEG may have a third mean delay value, etc.

In some examples, the TEG may be associated with one or more timing uncertainties in a group delay (GD) between the baseband (BB) (e.g., the baseband 706, 710) and the antennas (e.g., the antenna 708, 712) at a network node (e.g., the UE 704 or the base station 702) as discussed in connection with FIG. 7. There may be several reasons for which one or more group delays (GDs) may not be fully calibrated, such as part-specific (analog and digital paths) GDs, frequency-specific GDs, path-specific (time-varying) GDs, temperature-specific (time-varying) GDs, etc. As such, for purposes of the present disclosure, the TEG information described herein may be based on the TX and RX timing errors associated with one or more reference signal resources, such as DL PRS resources, UL PRS/SRS resources, and sidelink (SL) PRS resources. In other words, the TEG may be associated with one or more different uplink, downlink and/or sidelink signals, and may include TX and RX timing error values within a certain mare.

In one aspect of the present disclosure, a wireless device (e.g., a UE or a base station), performing a transmission or measurement on a positioning signal may provide to an entity performing the positioning calculation (e.g., a UE or an LMF) at least one of the following: (1) an associated Rx or RxTx TEG ID for each performed positioning measurement, depending on the measurement type (e.g., Rx-TEG for RSTD/RTOA and RxTx-TEG for Rx-Tx measurement, etc.); (2) an associated Tx TEG ID for a transmitted reference signal resource (e.g., SRS or DL-PRS); and/or (3) prior knowledge on a time error difference amongst the provided TEG IDs (e.g., mean/uncertainty of the timing error differences).

Figure 8:
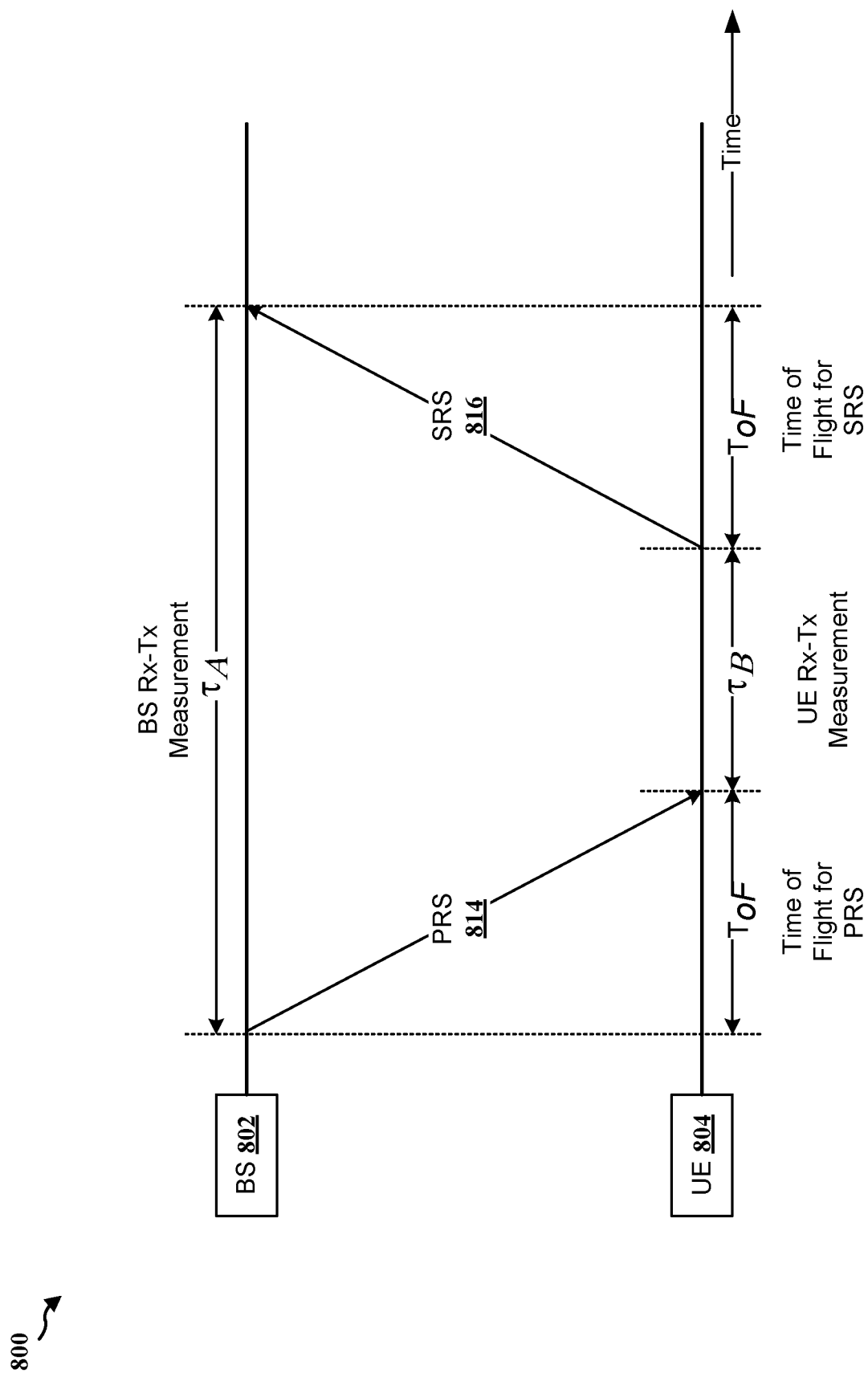
FIG. 8 is a diagram illustrating an example of a single-sided RTT measurement between a PRS and an SRS in accordance with various aspects of the present disclosure.

FIG. 8 is a diagram 800 illustrating an example of a single-sided RTT measurement between a PRS 814 transmitted by a base station 802 and an SRS transmitted by a UE 804 in accordance with various aspects of the present disclosure. In one example, $T_{oF}$ may denote a time of flight of a reference signal, such as a PRS 814 or an SRS 816; TA may denote an Rx-Tx time difference between a time in which the PRS 814 is transmitted from the base station 802 and a time in which the SRS 816 is received by the base station 802, and TB may denote an Rx-Tx time difference between a time in which the PRS 814 is received by the UE 804 and a time in which the SRS 816 is transmitted from the UE 804. In some examples, an RTT-based ranging and/or positioning (e.g., RTT between two or more UEs or RTT between a UE and one or more base stations) may not have accurate synchronization among different nodes (e.g., Tx timing error and/or Rx timing error), where a clock drift of each node may be a dominant component of the measurement error. In one example, for the single-sided RTT (e.g., a single-round PRS/SRS exchanging as shown by diagram 800), the clock drift may be modeled as $\hat{\tau}_A = (1+e_A)\tau_A$ and $\hat{\tau}_B = (1+e_B)\tau_B$, where $\hat{\tau}_A$ and $\hat{\tau}_B$ may denote Rx-Tx time differences measured at a baseband of the base station 802 and at a baseband of the UE 804, respectively, and $e_A$ or $e_B$ may model the deviation from ideal time at the base station 802 and the UE 804 respectively, and may be expressed in ppm/ppb (parts per million/billion). In some examples, a UE may be configured to not exceed a clock drift of up to ±0.1 ppm.

In one example, an RTT ($\hat{T}_{RTT}$) determined based on $\hat{\tau}_A$ and $\hat{\tau}_B$ (e.g., including Tx timing error and/or Rx timing error) may be denoted by $\hat{T}_{RTT} = \hat{\tau}_A - \hat{\tau}_B$ whereas an actual RTT ($T_{RTT}$) determined based on $\tau_A$ and $\tau_B$ (e.g., without Tx timing error and/or Rx timing error) may be denoted by $T_{RTT} = \tau_A - \tau_B$. Thus, an estimated RTT error between $\hat{T}_{RTT}$ and $T_{RTT}$ may be determined based on:

$$\hat{T}_{RTT} - T_{RTT} = (\hat{\tau}_A - \hat{\tau}_B) - (\tau_A - \tau_B) = e_A \tau_A - e_B \tau_B = e_A T_{RTT} + \tau_B (e_A - e_B).$$

In some examples, the $T_{RTT}$ may be in the order of microseconds, whereas $\tau_B$ may be in the order of milliseconds, and therefore $\tau_B(e_A - e_B)$ may be the dominant part of the estimation error. As some wireless devices may demand higher positioning accuracy (e.g., one (1) meter for general commercial use, or twenty (20) centimeters for IIoT, etc.), the maximum PRS-to-SRS time may be configured to be small, which may limit a base station's scheduling flexibility. For example, for an accuracy of 3-10 meters, the maximum PRS-to-SRS time may be:

$$\frac{3 * 10\%}{0.1 \, ppm * c} = 10 \text{ ms}$$

(10% being an error budget). However, for an accuracy that is within one meter or within twenty centimeters, the max PRS-to-SRS time may be 3.3 ms or 0.66 ms, which may limit a base station's scheduling flexibility. As such, time-drift error compensation may be implemented at the UE 804 and/or the base station 802, which may improve positioning accuracy if the PRS-to-SRS or SRS-to-PRS time is relatively long. While the examples illustrated in connection with FIGS. 7 and 8 show the PRS being transmitted from the base station before the SRS, the examples are merely for illustrative purposes. The same RTF measurement and error calculation may also apply when the SRS is transmitted before PRS.

To improve the efficiency of positioning and to reduce signaling overhead, a base station and a UE may be configured to perform a double-sided RTT measurement (or double-round RTT) based on three reference signals. FIGS. 9A and 9B are diagrams 900A and 900B, respectively, illustrating examples of double-side RTT. As shown by diagram the 900A, a base station 902 may be configured to transmit a first PRS 906 and a second PRS 910 to a UE 904, and the UE 904 may be configured to transmit an SRS 908 to the base station. Then, the base station 902 may perform a first RTT measurement based on the first PRS 906 and the SRS 908 (e.g., based on $\tau_{A,1}$ and $\tau_{B,1}$), and the base station 902 may perform a second RTT measurement based on the SRS 908 and the second PRS 910 (e.g., based on $\tau_{A,2}$ and $\tau_{B,2}$). Similarly, the UE 904 may also perform a first RTT measurement based on the first PRS 906 and the SRS 908 (e.g., based on $\tau_{A,1}$ and $\tau_{B,1}$), and the UE 904 may also perform a second RTT measurement based on the SRS 908 and the second PRS 910 (e.g., based on $\tau_{A,2}$ and $\tau_{B,2}$).

In another example, as shown by the diagram 900B, the UE 904 may be configured to transmit a first SRS 912 and a second SRS 916 to the base station 902, and the UE 904 may be configured to transmit a PRS 914 to the base station. Then, the base station 902 may perform a first RTT measurement based on the first SRS 912 and the PRS 914 (e.g., based on $\tau_{A,1}$ and $\tau_{B,1}$), and the base station 902 may perform a second RTT measurement based on the PRS 914 and the second PRS 910 (e.g., based on $\tau_{A,2}$ and $\tau_{B,2}$). Similarly, the UE 904 may also perform a first RTT measurement based on the first SRS 912 and the PRS 914 (e.g., based on $\tau_{A,1}$ and $\tau_{B,1}$), and the UE 904 may also perform a second MT measurement based on the PRS 914 and the second PRS 910 (e.g., based on $\tau_{A,2}$ and $\tau_{B,2}$).

In some examples, as shown by the diagrams 900A and 900B, a double-sided RTT measurement (or reference signal transmission for the double-sided RTT measurement) may be configured to be symmetric, where a slot offset between a first PRS and SRS may be equal to a slot offset between the SRS and a second PRS (e.g., for double-sided RTT associated with two PRSs and one SRS), or a slot offset between a first SRS and PRS may be equal to a slot offset between the PRS and a second SRS (e.g., for double-sided RTT associated with two SRSs and one PRS). For example, as shown by the diagram 900A, the base station 902 may be configured to transmit the second PRS 910 after receiving the SRS 908 at a time (e.g., an offset) that is the same as or similar to a time (e.g., an offset) in which the UE 904 transmits the SRS 908 after receiving the first PRS 906. In other words, values for the $\tau_{B,1}$ and the $\tau_{A,2}$ may be the same or similar. Similarly, as shown by the diagram 900B, the UE 904 may be configured to transmit the second SRS 916 after receiving the PRS 914 at a time that is the same as or similar to the time in which the base station 902 transmits the PRS 914 after receiving the first PRS 912. In other words, values for the $\tau_{A,1}$ and the $\tau_{B,2}$ may be the same or similar.

In some examples, as shown by diagrams 1000A and 1000B in FIGS. 10A and 10B, respectively, the double-sided RTT measurement (or reference signal transmission for the double-sided RTT measurement) may be configured to be asymmetric. For example, as shown by the diagrams 1000A and 1000B, the base station 902 may be configured to transmit the second PRS 910 after receiving the SRS 908 at a time that is not the same as or similar to the time in which the UE 904 transmits the SRS 908 after receiving the first PRS 906. In other words, values for the $\tau_{B,1}$ and the $\tau_{A,2}$ may be different. In addition, as shown by the diagram 1000B, for the double-sided RTT measurements, the UE 904 may transmit the SRS 908 before both the first PRS 906 and the second PRS 910. In other examples, the UE 904 may transmit the SRS 908 after both the first PRS 906 and the second PRS 910. While the examples illustrated in connection with FIGS. 10A and 10B show calculating RTTs based on two PRSs and one SRS, the examples are merely for illustrative purposes. The same RTT configuration may also apply to one PRS and two SRSs, such as shown by the diagram 900B of FIG. 9B. For example, values for the $\tau_{A,1}$ and the $\tau_{B,2}$ in the diagram 900A may be different, such that the two pairs of SRS-PRS are asymmetric. Similarly, the base station 902 may transmit the PRS 914 before receiving both the first PRS 912 and the second SRS 916, or the base station may transmit the PRS 914 after receiving both the first PRS 912 and the second SRS 916, etc.

TABLE 1

Algorithm and time-drift error comparison for symmetric and asymmetric double-sided RTT

| | Symmetric | Asymmetric |
|---|---|---|
| Drift-mitigated $\hat{T}_{RTT}$ calculation | $\frac{1}{2}(\hat{\tau}_{A,1} - \hat{\tau}_{B,1} + \hat{\tau}_{B,2} - \hat{\tau}_{A,2})$ | $\hat{\tau}_{A,1} - \frac{\hat{\tau}_{A,1} + \hat{\tau}_{A,2}}{\hat{\tau}_{B,1} + \hat{\tau}_{B,2}} \hat{\tau}_{B,1}$ |
| Drift-correction reference duration | N.A. | $\tau_1 + \tau_2$ |
| Error of $\hat{T}_{RTT}$ | $\frac{1}{2} T_{RTT}(e_A + e_B) + \frac{1}{2}(e_A - e_B)(\tau_{B,1} - \tau_{A,2})$ | $e_A T_{RTT}$ |
| Note | Three positioning RSs may be configured to be symmetric to mitigate the dominant part of the time-drift error. Less suitable for scheduling flexibility, but better (e.g., lower) latency. | The drift-correction reference duration may be configured to be long enough to be effective - otherwise the multiplicative correction factor may be a constant one (1). More suitable for scheduling flexibility, but less suitable for latency (e.g., higher latency). |

Table 1 illustrates examples of algorithms and time-drift error comparison for symmetric and asymmetric double-sided RTT in accordance with aspects of the present disclosure. For symmetric double-sided RTT, the drift-mitigated $\hat{T}_{RTT}$ calculation may be determined based on $\frac{1}{2}(\hat{\tau}_{A,1} - \hat{\tau}_{B,1} + \hat{\tau}_{B,2} - \hat{\tau}_{A,2})$, and the error of $\hat{T}_{RTT}$ may be estimated/determined based on $\frac{1}{2} T_{RTT}(e_A + e_B) + \frac{1}{2}(e_A - e_B)(\tau_{B,1} - \tau_{A,2})$. The symmetric nature between the two pairs of SRS and PRS (e.g., $\tau_{B,1} = \tau_{A,2}$ in diagram 900A) may mitigate the dominant part of the time-drift error, which may make scheduling less flexible while improving latency. For asymmetric double-sided RTT, the drift-mitigated $\hat{T}_{RTT}$ calculation may be determined based on $$\hat{\tau}_{A,1} - \frac{\hat{\tau}_{A,1} + \hat{\tau}_{A,2}}{\hat{\tau}_{B,1} + \hat{\tau}_{B,2}} \hat{\tau}_{B,1},$$

and the error of $\hat{T}_{RTT}$ may be estimated/determined based on $e_A T_{RTT}$, where the drift-error reference duration (e.g., as shown at 1002 of FIG. 10A) may be $\tau_1 + \tau_2$ (e.g., $\tau_{A,1} + \tau_{A,2}$ in FIG. 10A). The drift-correction reference duration may be selected to be long enough to be effective so that the multiplication correction factor is not a constant one (1), which may make scheduling more flexible but may also increase latency.

In one aspect of the present disclosure, multiple measurements for the double-sided RTT may also be reported based on batch reporting. FIG. 11A is a diagram 1100A illustrating an example of batch reporting for paired PRSs and one SRS (e.g., as discussed in connection with FIG. 9A). A UE may be configured with periodic or aperiodic sets of paired PRSs for performing multiple double-sided RTT measurements, where a first PRS and a second PRS of a paired PRSs may be configured to be Y ins apart, and a first PRS of one paired PRSs and a first PRS of another (next) paired PRSs may be configured to be X ms apart. In one example, as shown at 1102, the UE may include one double-sided RTT measurement (e.g., a first RTT/Tx-Rx time difference measurement between a first PRS and SRS, and a second RTT/Tx-Rx time difference measurement between the SRS and a second PRS) in one measurement report. In another example, as shown at 1104, the UE may include multiple double-sided RTT/Tx-Rx measurements (e.g., three (3) double-sided RTT/Tx-Rx measurements, K=3) in one measurement report, etc.

FIG. 11B is a diagram 1100B illustrating an example of batch reporting for one (1) SRS and paired PRSs (e.g., as discussed in connection with FIG. 9B). A UE may be configured to transmit periodically or aperiodically multiple sets of paired SRSs for performing multiple double-sided RTT measurements, where a first SRS and a second SRS of a paired SRSs may be configured to be Y ms apart, and a first SRS of one paired SRSs and a first SRS of another (next) paired SRSs may be configured to be X ms apart. In one example, as shown at 1106, the UE may include one double-sided RTT measurement (e.g., a first RTT/Tx-Rx time difference measurement between a first SRS and PRS, and a second RTT/Tx-Rx time difference measurement between the PRS and a second SRS) in one measurement report. In another example, as shown at 1108, the UE may include multiple double-sided RTT/Tx-Rx measurements (e.g., four (4) double-sided RTT/Tx-Rx measurements, K=4) in one measurement report, etc.

In some examples, a double-sided RTT measurement may be associated with a paired PRSs and a paired SRSs, where a base station may transmit a pair of PRSs to a UE, and the UE may transmit a corresponding pair of SRSs to the base station. Then, the base station and the UE may perform Rx-Tx time difference for SRS and PRS received/transmitted, such as described in connection with FIGS. 9A and 9B, and report the measurements to one another. For example, a base station may transmit a first PRS and a second PRS to a UE, and the UE may transmit a first SRS and a second SRS to the base station. As described in connection with FIG. 10B, the first PRS, the second PRS, the first SRS, and the second SRS may be transmitted in different temporal orders. In one example, after the base station receives the first SRS and the second SRS, the base station may perform Rx-Tx time difference measurement between the first PRS transmitted and the first SRS received, between the first SRS received and the second PRS transmitted, and/or between the second PRS transmitted and the second SRS received, etc. Then, the base station may transmit the three Rx-Tx time difference measurements to the UE. Similarly, the UE may perform Rx-Tx time difference measurement between the first PRS received and the first SRS transmitted, between the first SRS transmitted and the second PRS received, and/or between the second PRS received and the second SRS transmitted, etc. Based on the Rx-Tx time difference measurements received from the other entity, the UE and/or the base station may be able to determine the RTT between a PRS and an SRS (e.g., the difference between the Tx-Rx time differences measured at UE and at the base station).

Figure 12:
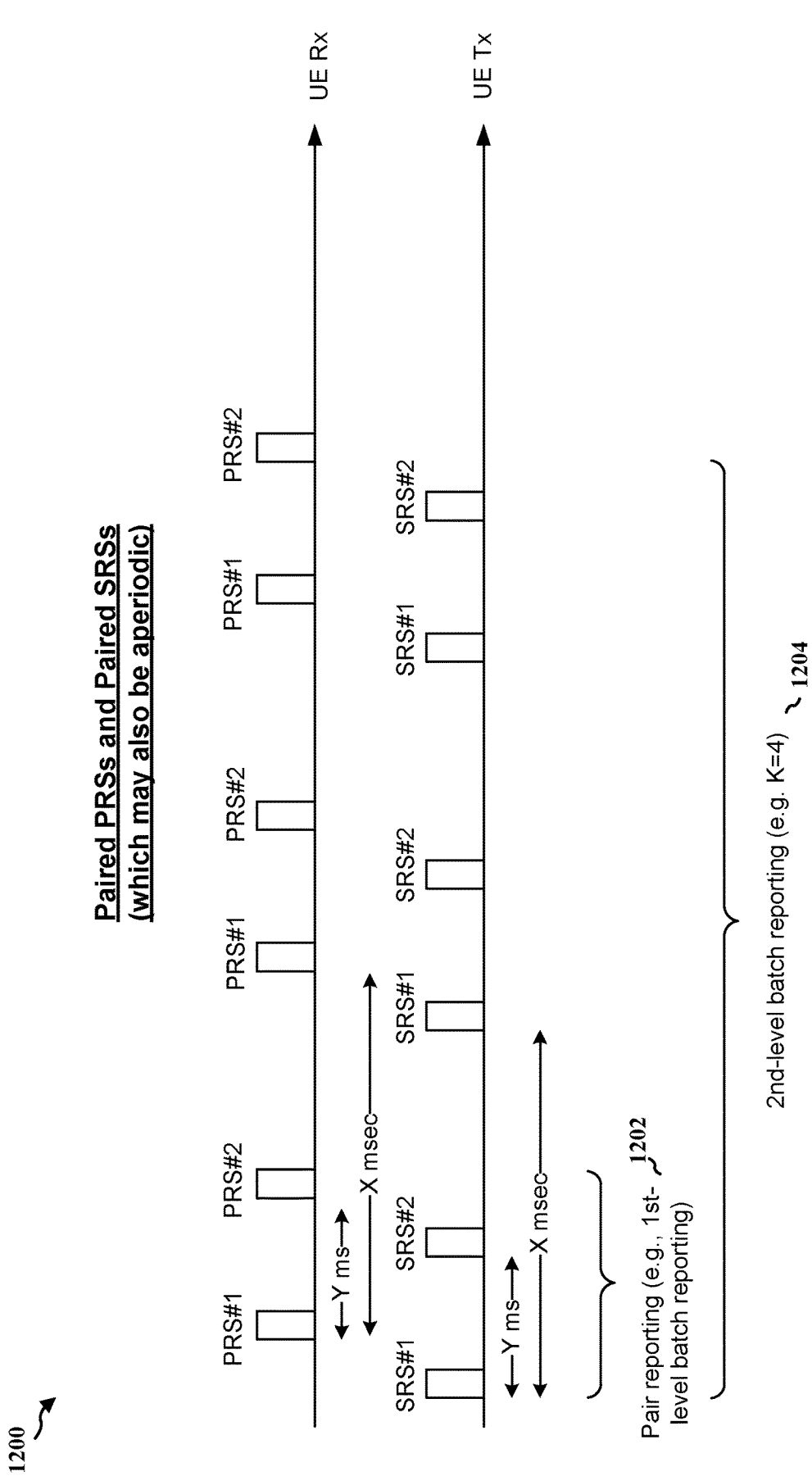
FIG. 12 is a diagram illustrating an example of batch reporting for paired SRSs and paired PRSs in accordance with various aspects of the present disclosure.

FIG. 12 is a diagram 1200 illustrating an example of batch reporting for paired SRSs and paired PRSs. A UE may be configured to transmit periodically or aperiodically multiple sets of paired SRSs to a base station for performing multiple double-sided RTT measurements, where a first SRS and a second SRS of a paired SRSs may be configured to be Y ms apart, and a first SRS of one paired SRSs and a first SRS of another (next) paired SRSs may be configured to be X ms apart. Similarly, the base station may be configured to transmit periodically or aperiodically multiple corresponding sets of paired PRSs to the UE for performing multiple double-sided RTT measurements, where a first PRS and a second PRS of a paired PRSs may be configured to be Y ms apart, and a first PRS of one paired. PRSs and a first PRS of another (next) paired PRSs may be configured to be X ms apart. In one example, as shown at 1202, the UE may include measurements associated with one paired PRS and one paired. SRS (e.g., RTTs or Rx-Tx time difference measurements between the first PRS received and the first SRS transmitted, between the first SRS transmitted and the second PRS received, and/or between the second PRS received and the second SRS transmitted) in one measurement report. In another example, as shown at 1204, the UE may include measurements associated with multiple pairs of PRSs and multiple pairs of corresponding SRS (e.g., K=3) in one measurement report, etc. In some examples, for either UE-assisted or UE-based RTT positioning, a UE or a base station may be configured to report one Rx-Tx time difference measurement to the other side (instead of two or three), since the other side may measure the paired time differences itself, such as for purposes of clock drift mitigation.

In some examples, for a UE-assisted or a UE-based positioning, the overhead of measurement reports may be reduced for paired SRSs and paired PRSs. For example, for UE-assisted positioning, a UE may report Rx-Tx time difference associated with a first PRS (PRS #1) (e.g., to obtain $\hat{\tau}_{B,1}$ in FIG. 9A) to the network (LMF), and the network (LMF) may obtain the UE's relative clock drift by measuring the timing of a first SRS (SRS #1) and a second SRS (SRS #2) (e.g., to obtain $\hat{\tau}_{A,1}+\hat{\tau}_{A,2}$ in FIG. 9A). In another example, for UE-based positioning, the network may report Rx-Tx time difference associated with a first SRS (SRS #1) to a UE (to obtain $\hat{\tau}_{A,1}$ in FIG. 9A), and the UE may obtain its relative clock drift by mearing the timing of a first PRS (PRS #1) and a second PRS (PRS #2) (to obtain $\hat{\tau}_{B,1}+\hat{\tau}_{B,2}$ in FIG. 9A). In summary, a UE or a network may report one Rx-Tx time difference measurement to the other side, as the other side may measure the paired time differences for clock drift mitigation itself.

Aspects presented herein may improve the efficiency and accuracy of double-sided RTT measurement. Aspects presented herein may enable a wireless device, such as a UE or a base station, to determine/measure RTT(s) between one or more pairs of PRS and SRS more accurately by including one or more TEG delays associated with transmission and/or reception of PRS and/or SRS in the double-sided RTT measurements. As such, aspects presented herein may improve positioning accuracy by mitigating UE Rx/Tx and/or gNB Rx/Tx timing delays (e.g., group delays). In one aspect, the Rx-Tx time difference measurement(s) at a UE and/or a base station for a double-sided RTT measurement/algorithm (e.g., $\hat{\tau}_{A,1}, \hat{\tau}_{A,2}, \hat{\tau}_{B,1}$ and/or $\hat{\tau}_{B,2}$ in FIG. 8) may be associated with TEG delays, such that the determined RTTs may be more accurate or more close to actual RTTs (e.g., based on actual Rx-Tx differences (e.g., $\tau_{A,1}$, $\tau_{A,2}$, $\tau_{B,1}$, and/or $\tau_{B,2}$ in FIG. 8). In another aspect, a base station may be configured to (e.g., by LMF) enable or apply a symmetric or semi-symmetric algorithm for a double-sided RTT configuration, as symmetric or semi-symmetric double-sided RTT may provide lower latency.

For purposes of the present disclosure, a UE Rx-Tx time difference (e.g., $\tau_{B,1}$, $\tau_{B,2}$) may be defined as $T_{UE\text{-}RX} - T_{UE\text{-}TX}$, where the $T_{UE\text{-}RX}$ may be the UE received timing of downlink subframe #i from a transmission point (TP), defined by the first detected path in time, and the $T_{UE\text{-}TX}$ may be the UE transmit timing of uplink subframe #j that is closest in time to the subframe #i received from the TP. Multiple DL PRS resources may be used to determine the start of one subframe of the first arrival path of the TP. A base station (gNB/BS) Rx-Tx time difference (e.g., $\tau_{B,1}$, $\tau_{B,2}$) may be defined as $T_{gNB\text{-}RX} - T_{gNB\text{-}TX}$, where the $T_{gNB\text{-}RX}$ may be the TRP received timing of uplink subframe #i containing SRS associated with a UE, defined by the first detected path in time, and the $T_{gNB\text{-}TX}$ may be the TRP transmit timing of downlink subframe #j that is closest in time to the subframe #i received from the UE. Multiple SRS resources for positioning may be used to determine the start of one subframe containing SRS.

Figure 13:
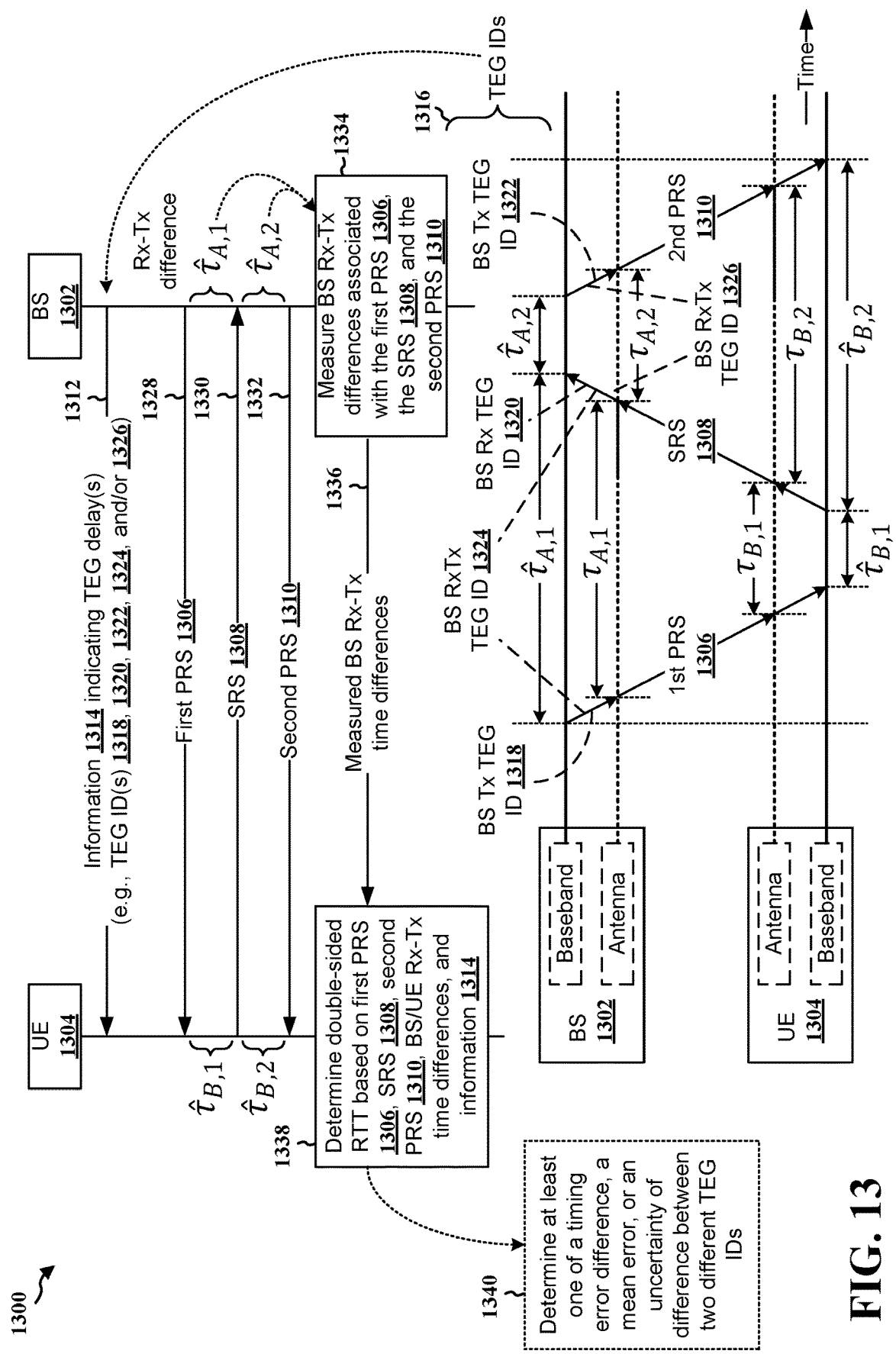
FIG. 13 is a communication flow illustrating an example of a double-sided MT measurement involving TEG delay(s) in accordance with various aspects of the present disclosure.

FIG. 13 is a communication flow 1300 illustrating an example of a double-sided RTT measurement involving TEG delay(s) in accordance with various aspects of the present disclosure. A base station 1302 may establish a positioning session with a UE 1304 based on a double-sided RTT involving a paired PRSs (e.g., a first PRS 1306, a second PRS 1310) and an SRS (e.g., an SRS 1308), such as described in connection with FIG. 9A.

In one aspect of the present disclosure, for double-sided RTT involving two PRSs and one SRS, the base station 1302 may be configured to indicate, to the UE 1304, measured Rx-Tx time difference(s) associated with the SRS, the BS Tx TEG ID(s) of the paired PRSs, and/or the BS RxTx TEG ID(s) of the measured Rx-Tx time differences associated with the SRS.

At 1312, the base station 1302 may transmit information 1314 indicating one or more TEG delay(s) that are associated with transmission of the first PRS 1306, reception of the SRS 1308, and/or the transmission of the second PRS 1310. For example, the base station 1302 may indicate a first TEG delay at the base station 1302 for a transmission of the first PRS 1306, a second TEG delay at the base station 1302 for a reception of the SRS 1308 from the UE 1304, a third TEG delay at the base station 1302 for a transmission of the second PRS 1310, a fourth TEG delay at the base station 1302 for a transmission of the first PRS 1306 and a reception of the SRS 1308 from the UE 1304 (e.g., the first Tx TEG delay and the second Rx TEG delay are combined into a TxRx TEG delay), or a fifth TEG delay at the base station 1302 for a reception of the SRS 1308 from the UE 1304 and a transmission of the second PRS 1310 (e.g., the second Rx TEG delay and the third Tx TEG delay are combined into a TxRx TEG delay), or any combination thereof, etc.

In some examples, as shown at 1316, the base station 1302 may indicate the one or more TEG delay(s) based on TEG ID(s), such as described in connection with FIG. 7. For example, the first TEG delay at the base station 1302 for the transmission of the first PRS 1306 may be associated with a BS Tx TEG ID 1318, the second TEG delay at the base station 1302 for the reception of the SRS 1308 from the UE 1304 may be associated with a BS Rx TEG ID 1320, and the third TEG delay at the base station 1302 for the transmission of the second. PRS 1310 may be associated with a BS Tx TEG ID 1322. In some examples, the fourth TEG delay at the base station 1302 for the transmission of the first PRS 1306 and the reception of the SRS 1308 from the UE 1304 may be associated with a BS RxTx TEG ID 1324, and/or the fifth TEG delay at the base station 1302 for the reception of the SRS 1308 from the UE 1304 and the transmission of the second PRS 1310 may be associated with a BS RxTx TEG ID 1326. As such, at 1312, the base station 1302 may include the associated TEG delay(s) in the information 1314 based on TEG For example, if the base station 1302 is configured to indicate the TEG delay for transmitting the first PRS 1306 to the UE 1304, the base station 1302 may include the corresponding BS Tx TEG ID 1318 in the information 1314. In another example, if the base station 1302 is configured to indicate the TEG delay for both transmitting the first PRS 1306 to the UE 1304 and for receiving the SRS 1308 from the UE, the base station 1302 may include the corresponding BS RxTx TEG ID 1324 in the information 1314. In some examples, each of the TEG ID(s) may correspond to or be associated with a delay time within an established margin, a mean delay value, and/or uncertainties around a mean delay time for each respective TEG, etc.

In some examples, the base station 1302 may use a same TEG ID for the paired PRSs (e.g., the first PRS 1306 and the second PRS 1310) to reduce the signaling overhead, such as when the TEG delays associated with the transmission of the first PRS 1306 and the transmission of the second PRS 1310 are similar or the same. In other words, the BS Tx TEG ID 1318 and the BS Tx TEG ID 1322 may be the same. Similarly, in other examples, the base station 1302 may use a same TEG ID for TEG delays that are associated with both transmitting PRS and receiving SRS if they are similar or the same. In other words, the BS RxTx TEG ID 1324 and the BS RxTx TEG ID 1326 may be the same.

At 1328 and 1332, the base station 1302 may transmit the first PRS 1306 and the second PRS 1310, respectively, to the UE 1304. At 1330, the UE 1304 may transmit the SRS 1308 to the base station 1302. In some examples, as described in connection with FIG. 10B, the SRS 1308 may be transmitted before or after both the first PRS 1306 and the second PRS 1310. In other examples, the information 1314 may be transmitted before, after, or during the transmissions of the first PRS 1306, the SRS 1308, and/or the second PRS 1310. Thus, examples illustrated by the communication flow 1300 are merely for illustrative purposes, and do not limit aspects of the present disclosure to a specific temporal order.

At 1334, after transmitting the first PRS 1306 and the second PRS 1310 and receiving the SRS 1308, the base station 1302 may determine a first Rx-Tx time difference (e.g., $\hat{\tau}_{A,1}$) between the transmission of the first PRS 1306 and the reception of the SRS 1308 and a second Rx-Tx time difference (e.g., $\hat{\tau}_{A,2}$) between the reception of the SRS 1308 and the transmission of the second PRS 1310. At 1336, the base station may transmit the measured first Rx-Tx time difference (e.g., $\hat{\tau}_{A,1}$) and the second Rx-Tx time difference (e.g., $\hat{\tau}_{A,2}$) to the UE 1304.

At 1338, the UE 1304 may determine a double-sided RTT based on a first PRS timing associated with the reception of the first PRS 1306, an SRS timing associated with the transmission of the SRS 1308, a second PRS timing associated with the reception of the second PRS 1310, the measured first Rx-Tx time difference (e.g., $\hat{\tau}_{A,1}$) and the second Rx-Tx time difference (e.g., $\hat{\tau}_{A,2}$) received from the base station, and the received information 1314.

For example, after receiving the first PRS 1306 and the second PRS 1310 and transmitting the SRS 1308, the UE 1304 may determine a first Rx-Tx time difference between the reception of the first PRS 1306 and the transmission of the SRS 1308 (e.g., $\hat{\tau}_{B,1}$ or $\tau_{B,1}$ if TEG delay at the LIE 1304 has been compensated or addressed) and a second Rx-Tx time difference between the transmission of the SRS 1308 and the reception of the second PRS 1310 (e.g., $\hat{\tau}_{B,2}$ or $\tau_{B,2}$ if TEG delay has been compensated or addressed). Then, the UE 1304 may determine a first RTT for the first PRS 1306 and the SRS 1308 based on $\hat{\tau}_{A,1}$ and $\hat{\tau}_{B,1}/\tau_{B,1}$, and further based on one or more BS TEG delay(s) associated with the first PRS 1306 and/or the SRS 1308 (e.g., based on the BS Tx TEG ID 1318, the BS Rx TEG ID 1320, and/or the BS RxTx TEG ID 1324, etc.). Similarly, the UE 1304 may determine a second RTT for the second PRS 1310 and the SRS 1308 based on $\hat{\tau}_{A,2}$ and $\hat{\tau}_{B,2}/\tau_{B,2}$, and further based on one or more BS TEG delay(s) associated with the second PRS 1310 and/or the SRS 1308 (e.g., based on the BS Rx TEG ID 1320, the BS Tx TEG ID 1322, and/or the BS RxTx TEG ID 1326, etc.). For example, the double-sided RTT may be determined based on $\frac{1}{2}(\hat{\tau}_{A,1}-\hat{\tau}_{B,1}+\hat{\tau}_{B,2}-\hat{\tau}_{A,2})$. In another example, the double-sided RTT may be determined based on $$\hat{\tau}_{A,1} - \left[\frac{(\hat{\tau}_{A,1} + \hat{\tau}_{A,2})}{(\hat{\tau}_{B,1} + \hat{\tau}_{B,2})} * \hat{\tau}_{B,1}\right].$$

In another example, the double-sided RTT may be determined based on $$\frac{1}{2}\left(\hat{\tau}_{A,1} - \frac{\hat{\tau}_{A,1} + \hat{\tau}_{A,2}}{\hat{\tau}_{B,1} + \hat{\tau}_{B,2}}\hat{\tau}_{B,1} + \frac{\hat{\tau}_{A,1} + \hat{\tau}_{A,2}}{\hat{\tau}_{B,1} + \hat{\tau}_{B,2}}\hat{\tau}_{B,2} - \hat{\tau}_{A,2}\right),$$

etc.

In one example, the UE Rx-Tx time difference measurements associated with the paired PRSs may be configured to have a same UE RxTx TEG ID, or two IDs that have a valid time error difference knowledge (e.g., difference value directly, or mean/uncertainty of the difference) between them. Similarly, the base station 1302's transmission of the paired PRSs (e.g., the first PRS 1306 and the second PRS 1310) may be configured to have a same BS Tx TEG ID, or two IDs that has valid time error difference value between them. As such, as shown at 1340, the UE 1304 may have a knowledge regarding the difference between different TEG IDs, and the UE 1304 may determine at least one of a timing error difference, a mean error, or an uncertainty of difference between two different TEG IDs. For example, if the BS Tx TEG ID 1318 corresponds to TEG #1 (e.g., with a mean delay of 2.3 ms) and the BS Tx TEG ID 1322 corresponds to TEG #3 (e.g., with a mean delay of 4.8 ms), the UE 1304 may have a knowledge (e.g., via configuration or pre-configuration) about the difference between the two TEG IDs (e.g., the difference between TEG #1 and TEG #3 is 2.5 ms). This may enable the UE 1304 to determine the double-sided RTT without knowing or calculating individual values associated with each BS Tx TEG ID.

Figure 14:
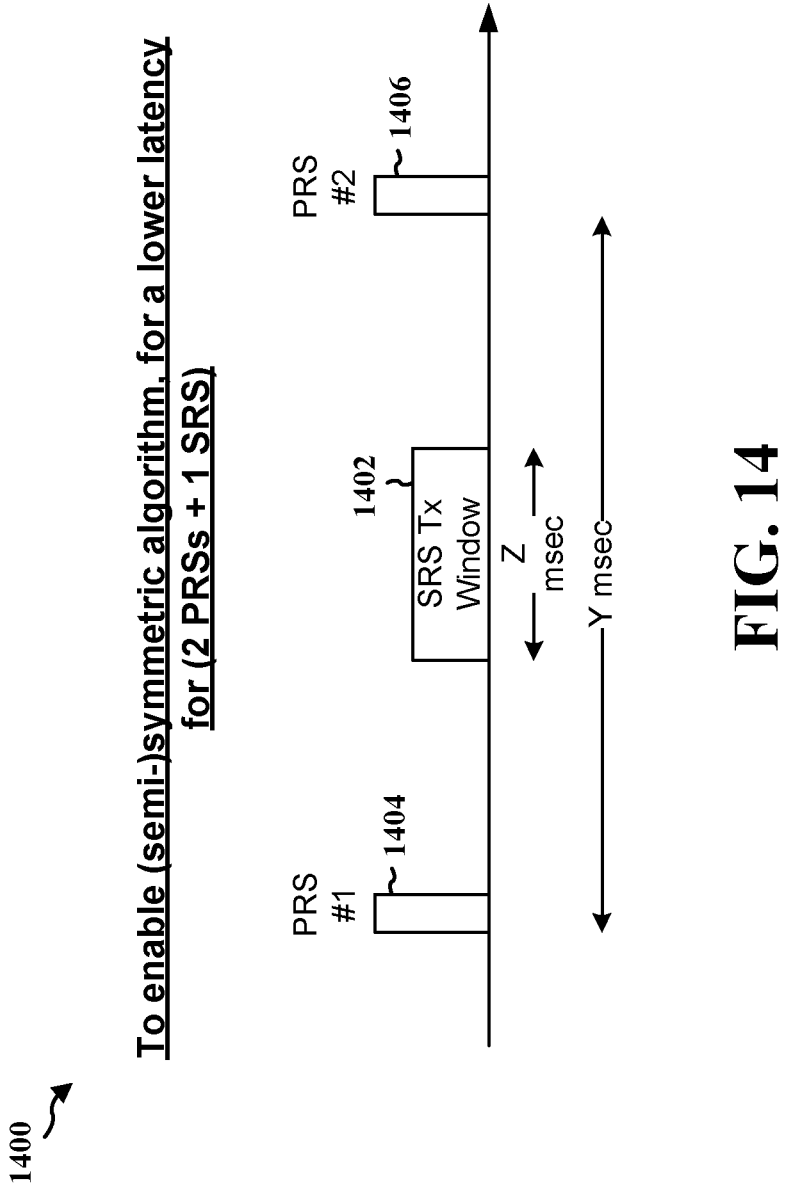
FIG. 14 is a diagram illustrating an example on configuring SRS transmission window in accordance with various aspects of the present disclosure.

In another aspect of the present disclosure, for an LMF or a base station to enable a symmetric or semi-symmetric double-sided RTT involving two PRSs and one SRS, as shown by diagram 1400 of FIG. 14, an LMF associated with a base station (e.g., the base station 1302) may configure an SRS transmission window 1402 for the SRS associated with the paired PRSs for the base station's RRC configuration. As such, a UE (e.g., the UE 1304) may be configured/scheduled by the base station to transmit the SRS within the SRS transmission window 1402 to enable the symmetric or semi-symmetric double-sided RTT. For example, the SRS transmission window 1402 may have a center approximately between a first PRS 1404 and a second PRS 1406, and a UE may be configured to transmit the SRS within the SRS transmission window 1402. In addition, the SRS transmission window 1402 may have a width of Z, where Z may be less than or equal to a threshold (e.g., Z=3 or 4 ms, which may correspond to one meter ranging error, 10% error budget assumed:

$$\frac{1*10\%}{0.1\ ppm*c} = 3.3\ m\ sec\right).$$

Figure 15:
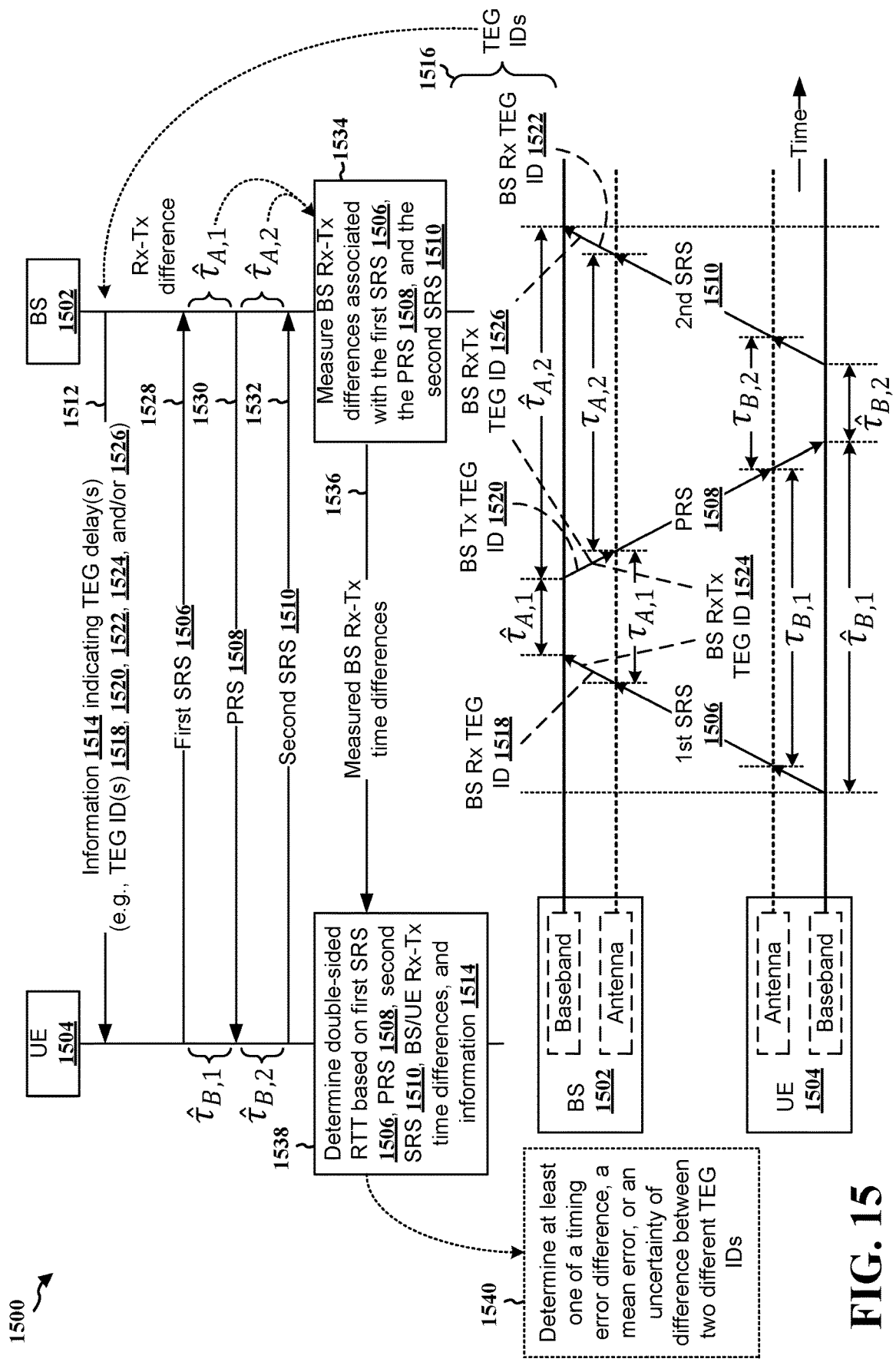
FIG. 15 is a communication flow illustrating an example of a double-sided RTT measurement involving TEG delay(s) in accordance with various aspects of the present disclosure.

FIG. 15 is a communication flow 1500 illustrating an example of a double-sided RTT measurement involving TEG delay(s) in accordance with various aspects of the present disclosure. A base station 1502 may establish a positioning session with a UE 1504 based on a double-sided RTT involving a paired SRSs (e.g., a first SRS 1506, a second SRS 1510) and a PRS (e.g., aPRS 1508), such as described in connection with FIG. 9A.

In one aspect of the present disclosure, for double-sided. RTT involving two SRSs and one PRS, the base station 1502 may be configured to indicate, to the UE 1504, measured Rx-Tx time difference(s) associated with the paired SRSs, the BS RxTx TEG ID(s) of the paired SRSs, and/or the BS Tx TEG ID(s) of the PRS to the UE.

At 1512, the base station 1502 may transmit information 1514 indicating one or more TEG delay(s) that are associated with reception of the first SRS 1506, transmission of the PRS 1508, and/or the reception of the second SRS 1510. For example, the base station 1502 may indicate a first TEG delay at the base station 1502 for a reception of the first SRS 1506, a second TEG delay at the base station 1502 for a transmission of the PRS 1508 to the UE 1504, a third TEG delay at the base station 1502 for a reception of the second. SRS 1510, a fourth TEG delay at the base station 1502 for a reception of the first SRS 1506 and a transmission of the PRS 1508 to the UE 1504 (e.g., the first Rx TEG delay and the second Tx TEG delay are combined into a TxRx TEG delay), or a fifth TEG delay at the base station 1502 for a transmission of the PRS 1508 to the UE 1504 and a reception of the second SRS 1510 (e.g., the second Tx TEG delay and the third Rx TEG delay are combined into a TxRx TEG delay), or any combination thereof, etc.

In some examples, as shown at 1516, the base station 1502 may indicate the one or more TEG delay(s) based on TEG ID(s), such as described in connection with FIG. 7. For example, the first TEG delay at the base station 1502 for the reception of the first SRS 1506 may be associated with a BS Rx TEG ID 1518, the second TEG delay at the base station 1502 for the transmission of the PRS 1508 to the UE 1504 may be associated with a BS Tx TEG ID 1520, and the third TEG delay at the base station 1502 for the reception of the second SRS 1510 may be associated with a BS Rx TEG ID 1522. In some examples, the fourth TEG delay at the base station 1502 for the reception of the first SRS 1506 and the transmission of the PRS 1508 to the UE 1504 may be associated with a BS RxTx TEG ID 1524, and/or the fifth TEG delay at the base station 1502 for the transmission of the PRS 1508 to the UE 1504 and the reception of the second SRS 1510 may be associated with a BS RxTx TEG ID 1526. As such, at 1512, the base station 1502 may include the associated. TEG delay(s) in the information 1514 based on TEG ID(s). For example, if the base station 1502 is configured to indicate the TEG delay for receiving the first SRS 1506 to the UE 1504, the base station 1502 may include the corresponding BS Rx TEG ID 1518 in the information 1514. In another example, if the base station 1502 is configured to indicate the TEG delay for both receiving the first SRS 1506 from the UE 1504 and for transmitting the PRS 1508 to the UE 1504, the base station 1502 may include the corresponding BS RxTx TEG ID 1524 in the information 1514. In some examples, each of the TEG ID(s) may correspond to or be associated with a delay time within an established margin, a mean delay value, and/or uncertainties around a mean delay time for each respective TEG, etc.

In some examples, the base station 1502 may use a same TEG ID for the paired SRSs (e.g., the first SRS 1506 and the second SRS 1510) to reduce the signaling overhead, such as when the TEG delays associated with the reception of the first SRS 1506 and the reception of the second SRS 1510 are similar or the same. In other words, the BS Rx TEG ID 1518 and the BS Rx TEG ID 1522 may be the same. Similarly, in other examples, the base station 1502 may use a same TEG ID for TEG delays that are associated with both receiving SRSs and transmitting PRS if they are similar or the same. In other words, the BS RxTx TEG ID 1524 and the BS RxTx TEG ID 1526 may be the same.

At 1528 and 1532, the UE 1504 may transmit the first SRS 1506 and the second SRS 1510, respectively, to the base station 1502. At 1530, the base station 1502 may transmit the PRS 1508 to the UE 1504. In some examples, as described in connection with FIG. 10B, the PRS 1508 may be transmitted before or after both the first SRS 1506 and the second SRS 1510. In other examples, the information 1514 may be transmitted before, after, or during the transmissions of the first SRS 1506, the PRS 1508, and/or the second SRS 1510. Thus, examples illustrated by the communication flow 1500 are merely for illustrative purposes, and do not limit aspects of the present disclosure to a specific temporal order.

At 1534, after receiving the first SRS 1506 and the second SRS 1510 and transmitting the PRS 1508, the base station 1502 may determine a first Rx-Tx time difference (e.g., $\hat{\tau}_{A,1}$) between the reception of the first SRS 1506 and the transmission of the PRS 1508 and a second Rx-Tx time difference (e.g., $\hat{\tau}_{A,2}$) between the transmission of the PRS 1508 and the reception of the second SRS 1510. At 1536, the base station may transmit the measured first Rx-Tx time difference (e.g., $\hat{\tau}_{A,1}$) and the second Rx-Tx time difference (e.g., $\hat{\tau}_{A,2}$) to the UE 1504.

At 1538, the UE 1504 may determine a double-sided RTT based on a first SRS timing associated with the transmission of the first SRS 1506, a PRS timing associated with the reception of the PRS 1508, a second SRS timing associated with the transmission of the second SRS 1510, the measured first Rx-Tx time difference (e.g., $\hat{\tau}_{A,1}$) and the second Rx-Tx time difference (e.g., $\hat{\tau}_{A,2}$) received from the base station, and the received information 1514.

For example, after transmitting the first SRS 1506 and the second SRS 1510 and receiving the PRS 1508, the UE 1504 may determine a first Rx-Tx time difference between the transmission of the first SRS 1506 and the reception of the PRS 1508 (e.g., $\hat{\tau}_{B,1}$ or $\tau_{B,1}$ if TEG delay at the HE 1504 has been compensated or addressed) and a second Rx-Tx time difference between the reception of the PRS 1508 and the transmission of the second SRS 1510 (e.g., $\hat{\tau}_{B,2}$ or $\tau_{B,2}$ if TEG delay has been compensated or addressed). Then, the UE 1504 may determine a first RTT for the first SRS 1506 and the PRS 1508 based on $\hat{\tau}_{A,1}$ and $\hat{\tau}_{B,1}/\tau_{B,1}$, and further based on one or more BS TEG delay(s) associated with the first SRS 1506 and/or the PRS 1508 (e.g., based on the BS Rx TEG ID 1518, the BS Tx TEG ID 1520, and/or the BS RxTx TEG ID 1524, etc.). Similarly, the UE 1504 may determine a second RTT for the second SRS 1510 and the PRS 1508 based on $\hat{\tau}_{A,2}$ and $\hat{\tau}_{B,2}/\tau_{B,2}$, and further based on one or more BS TEG delay(s) associated with the second SRS 1510 and/or the PRS 1508 (e.g., based on the BS Tx TEG ID 1520, the BS Rx TEG ID 1522, and/or the BS RxTx TEG ID 1526, etc.). For example, the double-sided RTT may be determined based on $\frac{1}{2}(\hat{\tau}_{A,1}-\hat{\tau}_{B,1}+\hat{\tau}_{B,2}-\hat{\tau}_{A,2})$. In another example, the double-sided RTT may be determined based on $$\hat{\tau}_{A,1} - \left[\frac{(\hat{\tau}_{A,1}+\hat{\tau}_{A,2})}{(\hat{\tau}_{B,1}+\hat{\tau}_{B,2})}*\hat{\tau}_{B,1}\right].$$

In another example, the double-sided RTT may be determined based on $$\frac{1}{2}\left(\hat{\tau}_{A,1} - \frac{\hat{\tau}_{A,1}+\hat{\tau}_{A,2}}{\hat{\tau}_{B,1}+\hat{\tau}_{B,2}}\hat{\tau}_{B,1} + \frac{\hat{\tau}_{A,1}+\hat{\tau}_{A,2}}{\hat{\tau}_{B,1}+\hat{\tau}_{B,2}}\hat{\tau}_{B,2} - \hat{\tau}_{A,2}\right),$$

etc.

In one example, the BS Rx-Tx time difference measurements associated with the paired SRSs may have a same BS RxTx TEG ID, or two IDs that have valid time error difference knowledge (e.g., difference value directly, or mean/uncertainty of the difference) between them. Similarly, the UE 1504's transmission of the paired SRSs may have a same HE Tx TEG ID, or two (2) IDs that have valid time error difference value between them. As such, as shown at 1540, the UE 1504 may have knowledge regarding the difference between different TEG IDs, and the HE 1504 may determine at least one of a timing error difference, a mean error, or an uncertainty of difference between two different TEG IDs. For example, if the BS Rx TEG ID 1518 corresponds to TEG #1 (e.g., with a mean delay of 2.3 ms) and the BS Rx TEG ID 1522 corresponds to TEG #3 (e.g., with a mean delay of 4.8 ms), the UE 1504 may have a knowledge (e.g., via configuration or pre-configuration) about the difference between the two TEG IDs (e.g., the difference between TEG #1 and TEG #3 is 2.5 ms). This may enable the UE 1504 to determine the double-sided RTT without knowing or calculating individual values associated with each BS Rx TEG ID.

Figure 16:
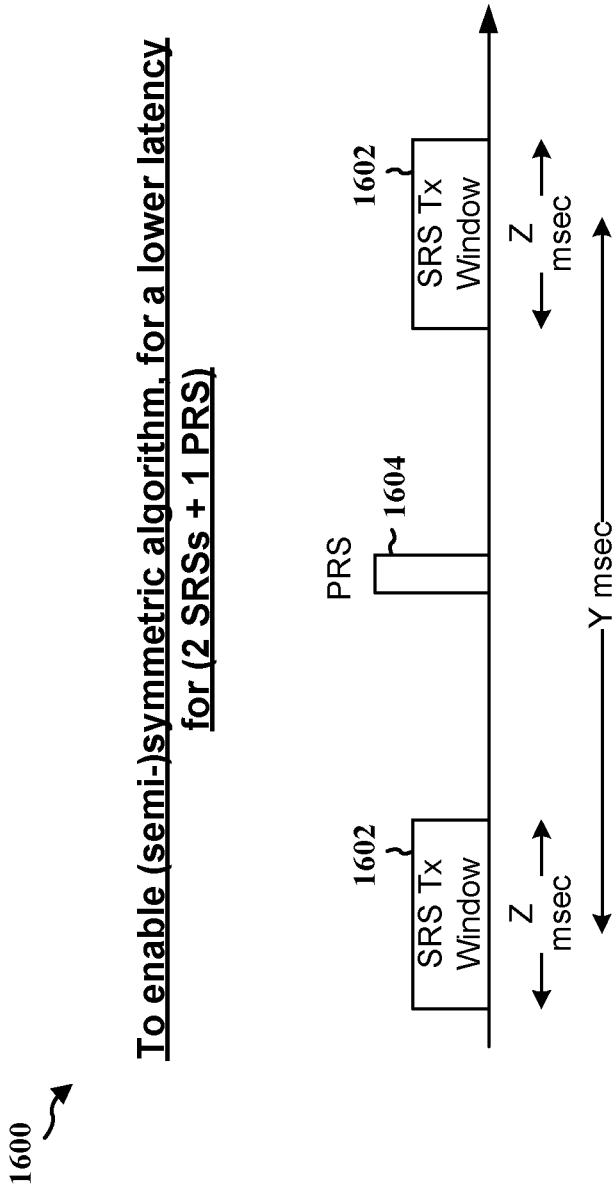
FIG. 16 is a diagram illustrating an example on configuring a pair of SRS transmission windows in accordance with various aspects of the present disclosure.

In another aspect of the present disclosure, for an LMF or a base station to enable a symmetric or semi-symmetric double-sided RTT involving two SRSs and one PRS, as shown by diagram 1600 of FIG. 16, an LMF associated with a base station (e.g., the base station 1502) may configure a pair of SRS transmission windows 1602 for the paired SRSs associated with a PRS 1604 for the base station's RRC configuration. As such, a UE (e.g., the UE 1504) may be configured/scheduled by the base station to transmit the SRSs within their respective SRS transmission windows 1602 to enable the symmetric or semi-symmetric double-sided RTT. For example, the paired SRS transmission windows 1602 may have a center located at the PRS 1604 reception occasion, and a UE may be configured to transmit the SRS within the SRS transmission window 1602. In addition, the SRS transmission window 1602 may have a width of Z, where Z may be less than or equal to a threshold.

Figure 17:
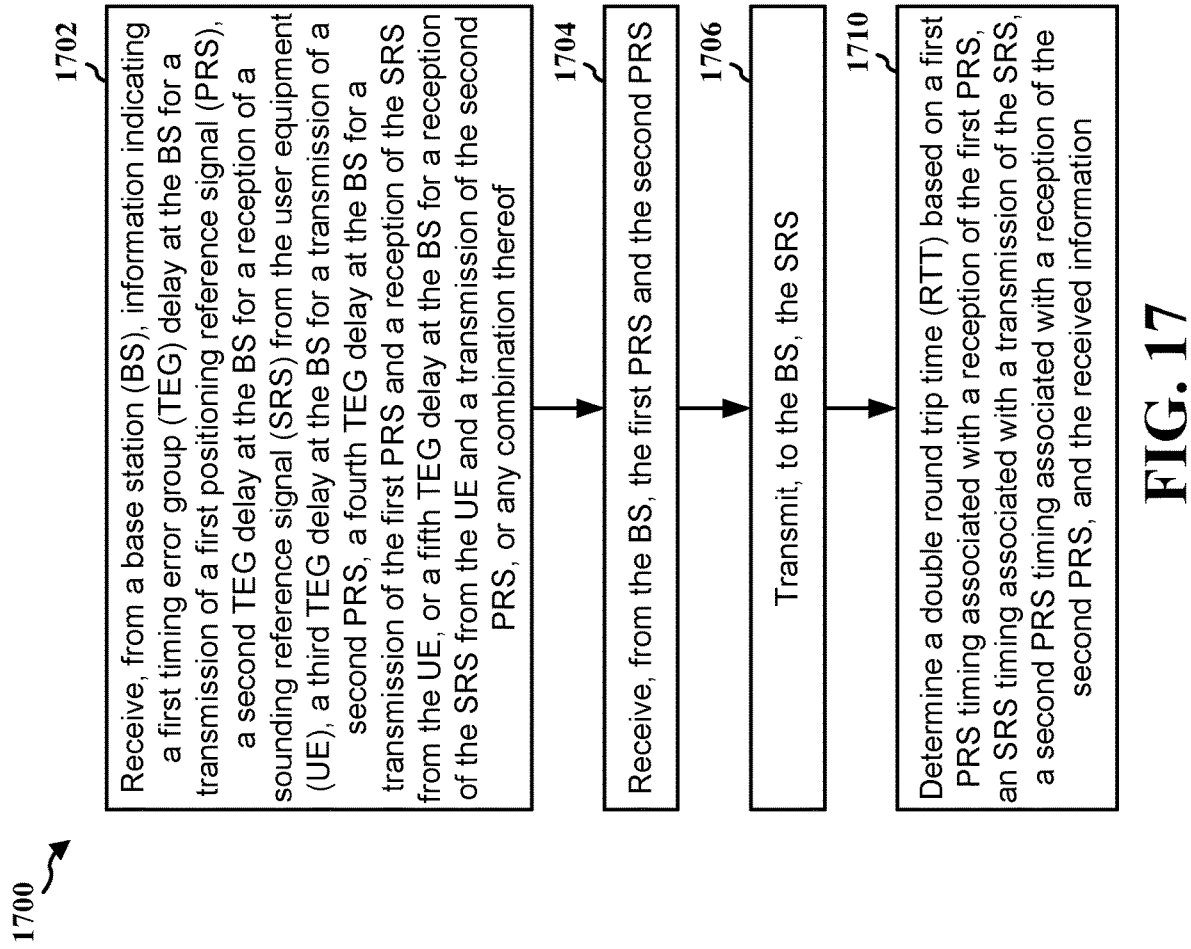
FIG. 17 is a flowchart of a method of wireless communication in accordance with aspects presented herein.

FIG. 17 is a flowchart 1700 of a method of wireless communication. The method may be performed by a UE or a component of a UE (e.g., the UE 104, 350, 704, 804, 904,

1304; the apparatus 1902; a processing system, which may include the memory 360 and which may be the entire UE 350 or a component of the UE 350, such as the TX processor 368, the RX processor 356, and/or the controller/processor 359). The method may enable the UE to perform double-sided RTT measurement more accurately by including one or more TEG delays associated with transmission and/or reception of PRS/SRS at the base station in the double-sided RTT measurement.

At 1702, the UE may receive; from a BS, information indicating a first TEG delay at the BS for a transmission of a first PRS, a second TEG delay at the BS for a reception of an SRS from the UE, a third TEG delay at the BS for a transmission of a second PRS, a fourth TEG delay at the BS for a transmission of the first PRS and a reception of the SRS from the UE, or a fifth TEG delay at the BS for a reception of the SRS from the UE and a transmission of the second PRS, or any combination thereof, such as described in connection with FIG. 13. For example, at 1312, the UE 1304 may receive, from the base station 1302, the information 1314 indicating one or more TEG delay(s) (e.g., TEG ID(s) 1318, 1320, 1322, 1324, and/or 1326). The reception of the information may be performed by, e.g., the BS TEG delay process component 1940 and/or the reception component 1930 of the apparatus 1902 in FIG. 19.

In one example, the information may indicate at least one of a first BS Tx TEG ID associated with the first TEG delay, a BS Rx TEG ID associated with the second TEG delay, and a second BS Tx TEG ID associated with the third TEG delay. In such an example, the UE may determine at least one of a timing error difference, a mean error, or an uncertainty of difference between the first BS Tx TEG ID and the second BS Tx TEG ID, where the double RTT may be determined further based on the at least one of the timing error difference, the mean error, or the uncertainty of difference.

In another example, the information may indicate a BS Tx TEG ID associated with the first TEG delay and the third TEG delay, and a BS Rx TEG ID associated with the second TEG delay.

In another example, the information may indicate a first BS Rx and Tx TEG ID associated with the fourth TEG delay and a second BS Rx and Tx TEG ID associated with the fifth TEG delay. In such an example, the UE may determine at least one of a timing error difference, a mean error, or an uncertainty of difference between the first BS Rx and Tx TEG ID and the second BS Rx and Tx TEG ID, where the double RTT may be determined further based on the at least one of the timing error difference, the mean error, or the uncertainty of difference.

In another example, the information may indicate a BS Rx and Tx TEG ID associated with both the fourth TEG delay and the fifth TEG delay.

In another example, the information may indicate a first BS Tx TEG ID associated with the first TEG delay, a second BS Tx TEG ID associated with the third TEG delay, and a BS Rx and Tx TEG ID associated with the fourth TEG delay. In such an example, the UE may determine at least one of a timing error difference, a mean error, or an uncertainty of difference between the first BS Tx TEG ID and the second BS Tx TEG ID, where the double RTT may be determined further based on the at least one of the timing error difference, the mean error, or the uncertainty of difference.

In another example, the information may indicate a BS Tx TEG ID associated with the first TEG delay and the third TEG delay, and a BS Rx and Tx TEG ID associated with the fourth TEG delay.

In another example, the information may indicate a first BS Tx TEG ID associated with the first TEG delay, a second BS Tx TEG ID associated with the third TEG delay, and a BS Rx and Tx TEG ID associated with the fifth TEG delay. In such an example, the UE may determine at least one of a timing error difference, a mean error, or an uncertainty of difference between the first BS Tx TEG ID and the second BS Tx TEG ID, where the double RTT may be determined further based on the at least one of the timing error difference, the mean error, or the uncertainty of difference.

In another example, the information may indicate a BS Tx TEG ID associated with the first TEG delay and the third TEG delay, and a BS Rx and Tx TEG ID associated with the fifth TEG delay.

At 1704, the UE may receive, from the BS, the first PRS and the second PRS, such as described in connection with FIG. 13. For example, at 1328 and 1332, the UE 1304 may receive the first PRS 1306 and the second PRS 1310 from the base station 1302. The reception of the PRSs may be performed by, e.g., the PRS process component 1942 and/or the reception component 1930 of the apparatus 1902 in FIG. 19.

At 1706, the UE may transmit, to the BS, the SRS, such as described in connection with FIG. 13. For example, at 1330, the UE 1304 may transmit the SRS 1308 to the base station 1302. The transmission of the SRS may be performed by, e.g., the SRS process component 1944 and/or the transmission component 1934 of the apparatus 1902 in FIG. 19.

In one example, the UE may receive, from the BS, first BS time difference measurement information associated with the first PRS and the SRS, and second BS time difference measurement information associated with the second PRS and the SRS, where the double RTT may be determined further based on the received first BS time difference measurement information and the received second BS time difference measurement information, such as described in connection with FIG. 13. For example, at 1336, the UE 1304 may receive BS Rx-Tx difference measurements from the base station 1302. The reception of the BS time difference measurements may be performed by, e.g., the BS TxRx process component 1946 and/or the reception component 1930 of the apparatus 1902 in FIG. 19.

In another example, the UE may determine first UE time difference measurement information associated with the first PRS timing and the SRS timing, and determine second UE time difference measurement information associated with the second PRS timing and the SRS timing. In such an example, the double RTT may be determined further based on the first UE time difference measurement information and the second UE time difference measurement information.

At 1710, the UE may determine a double RTT based on a first PRS timing associated with the reception of the first PRS, an SRS timing associated with the transmission of the SRS, a second PRS timing associated with the reception of the second PRS, and the received information, such as described in connection with FIG. 13. For example, at 1338, the UE 1304 may determine double-sided RTT based on first PRS 1306, SRS 1308, second PRS 1310, BS/UE Rx-Tx time differences, and information 1314. The determination of the double-sided RTT may be performed by, e.g., the double-sided RTT determination component 1948 of the apparatus 1902 in FIG. 19.

In some examples, the UE may receive a configuration for an SRS transmission window for transmitting the SRS, the SRS transmission window having a center approximately between the first PRS and the second PRS, where the SRS may be transmitted based on the received configuration for the SRS transmission window, such as described in connection with FIG. 14. The reception of the configuration for the SRS transmission window may be performed by, e.g., the SRS window configuration component 1950 and/or the reception component 1930 of the apparatus 1902 in FIG. 19. The SRS transmission window may include a width of Z, where Z may be configured to be less than or equal to a threshold.

FIG. 18 is a flowchart 1800 of a method of wireless communication. The method may be performed by a UE or a component of a UE (e.g., the UE 104, 350, 704, 804, 904, 1304; the apparatus 1902; a processing system, which may include the memory 360 and which may be the entire UE 350 or a component of the UE 350, such as the TX processor 368, the RX processor 356, and/or the controller/processor 359). The method may enable the UE to perform double-sided RTT measurement more accurately by including one or more TEG delays associated with transmission and/or reception of PRS/SRS at the base station in the double-sided RTT measurement.

At 1802, the UE may receive, from a BS, information indicating a first TEG delay at the BS for a transmission of a first PRS, a second TEG delay at the BS for a reception of an SRS from the UE, a third TEG delay at the BS for a transmission of a second PRS, a fourth TEG delay at the BS for a transmission of the first PRS and a reception of the SRS from the UE, or a fifth TEG delay at the BS for a reception of the SRS from the UE and a transmission of the second PRS, or any combination thereof, such as described in connection with FIG. 13. For example, at 1312, the UE 1304 may receive, from the base station 1302, the information 1314 indicating one or more TEG delay(s) (e.g., TEG ID(s) 1318, 1320, 1322, 1324, and/or 1326). The reception of the information may be performed by, e.g., the BS TEG delay process component 1940 and/or the reception component 1930 of the apparatus 1902 in FIG. 19.

In one example, the information may indicate at least one of a first BS Tx TEG ID associated with the first TEG delay, a BS Rx TEG ID associated with the second TEG delay, and a second BS Tx TEG ID associated with the third TEG delay. In such an example, the UE may determine at least one of a timing error difference, a mean error, or an uncertainty of difference between the first BS Tx TEG ID and the second BS Tx TEG ID, where the double RTT may be determined further based on the at least one of the timing error difference, the mean error, or the uncertainty of difference.

In another example, the information may indicate a BS Tx TEG ID associated with the first TEG delay and the third TEG delay, and a BS Rx TEG ID associated with the second TEG delay.

In another example, the information may indicate a first BS Rx and Tx TEG ID associated with the fourth TEG delay and a second BS Rx and Tx TEG ID associated with the fifth TEG delay. In such an example, the UE may determine at least one of a timing error difference, a mean error, or an uncertainty of difference between the first BS Rx and Tx TEG ID and the second BS Rx and Tx TEG ID, where the double RTT may be determined further based on the at least one of the timing error difference, the mean error, or the uncertainty of difference.

In another example, the information may indicate a BS Rx and Tx TEG ID associated with both the fourth TEG delay and the fifth TEG delay.

In another example, the information may indicate a first BS Tx TEG ID associated with the first TEG delay, a second BS Tx TEG ID associated with the third TEG delay, and a BS Rx and Tx TEG ID associated with the fourth TEG delay.

In such an example, the UE may determine at least one of a timing error difference, a mean error, or an uncertainty of difference between the first BS Tx TEG ID and the second BS Tx TEG ID, where the double RTT may be determined further based on the at least one of the timing error difference, the mean error, or the uncertainty of difference.

In another example, the information may indicate a BS Tx TEG ID associated with the first TEG delay and the third TEG delay, and a BS Rx and Tx TEG ID associated with the fourth TEG delay.

In another example, the information may indicate a first BS Tx TEG ID associated with the first TEG delay, a second BS Tx TEG ID associated with the third TEG delay, and a BS Rx and Tx TEG ID associated with the fifth TEG delay. In such an example, the UE may determine at least one of a timing error difference, a mean error, or an uncertainty of difference between the first BS Tx TEG ID and the second BS Tx TEG ID, where the double RTT may be determined further based on the at least one of the timing error difference, the mean error, or the uncertainty of difference.

In another example, the information may indicate a BS Tx TEG ID associated with the first TEG delay and the third TEG delay, and a BS Rx and Tx TEG ID associated with the fifth TEG delay.

At 1804, the UE may receive, from the BS, the first PRS and the second PRS, such as described in connection with FIG. 13. For example, at 1328 and 1332, the UE 1304 may receive the first PRS 1306 and the second PRS 1310 from the base station 1302. The reception of the PRSs may be performed by, e.g., the PRS process component 1942 and/or the reception component 1930 of the apparatus 1902 in FIG. 19.

At 1806, the UE may transmit, to the BS, the SRS, such as described in connection with FIG. 13. For example, at 1330, the UE 1304 may transmit the SRS 1308 to the base station 1302. The transmission of the SRS may be performed by, e.g., the SRS process component 1944 and/or the transmission component 1934 of the apparatus 1902 in FIG. 19.

At 1808, the UE may receive, from the BS, first BS time difference measurement information associated with the first PRS and the SRS, and second BS time difference measurement information associated with the second PRS and the SRS, where the double RTT may be determined further based on the received first BS time difference measurement information and the received second BS time difference measurement information, such as described in connection with FIG. 13. For example, at 1336, the UE 1304 may receive BS Rx-Tx difference measurements from the base station 1302. The reception of the BS time difference measurements may be performed by, e.g., the BS TxRx process component 1946 and/or the reception component 1930 of the apparatus 1902 in FIG. 19.

At 1809, the UE may determine first UE time difference measurement information associated with the first PRS timing and the SRS timing, and determine second LIE time difference measurement information associated with the second PRS timing and the SRS timing. In such an example, the double RTT may be determined further based on the first UE time difference measurement information and the second UE time difference measurement information.

At 1810, the UE may determine a double RTT based on a first PRS tinting associated with the reception of the first PRS, an SRS timing associated with the transmission of the SRS, a second PRS timing associated with the reception of the second PRS, and the received information, such as described in connection with FIG. 13. For example, at 1338, the UE 1304 may determine double-sided RTT based on first PRS 1306, SRS 1308, second PRS 1310, BS/UE Rx-Tx time differences, and information 1314. The determination of the double-sided RTT may be performed by, e.g., the double-sided RTT determination component 1948 of the apparatus 1902 in FIG. 19.

In some examples, as shown at 1812, the UE may receive a configuration for an SRS transmission window for transmitting the SRS, the SRS transmission window having a center approximately between the first PRS and the second PRS, where the SRS may be transmitted based on the received configuration for the SRS transmission window, such as described in connection with FIG. 14. The reception of the configuration for the SRS transmission window may be performed by, e.g., the SRS window configuration component 1950 and/or the reception component 1930 of the apparatus 1902 in FIG. 19. The SRS transmission window may include a width of Z, where Z may be configured to be less than or equal to a threshold.

Figure 19:
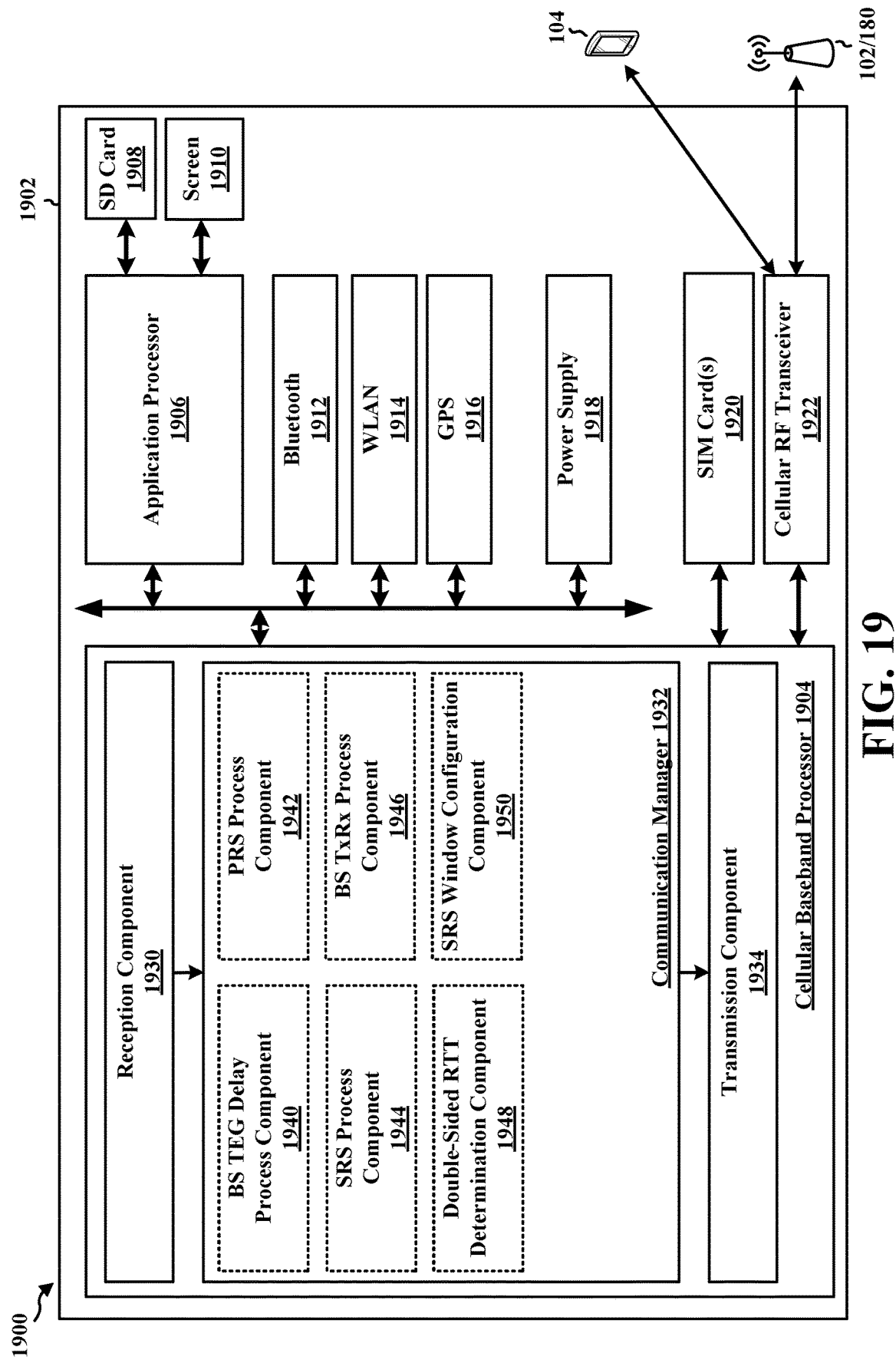
FIG. 19 is a diagram illustrating an example of a hardware implementation for an example apparatus in accordance with aspects presented herein.

FIG. 19 is a diagram 1900 illustrating an example of a hardware implementation for an apparatus 1902. The apparatus 1902 is a UE and includes a cellular baseband processor 1904 (also referred to as a modem) coupled to a cellular RF transceiver 1922 and one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GP 5) module 1916, and a power supply 1918. The cellular baseband processor 1904 communicates through the cellular RF transceiver 1922 with the UE 104 and/or BS 102/190. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. The cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (e.g., see 350 of FIG. 3) and include the aforediscussed additional modules of the apparatus 1902.

The communication manager 1932 includes a BS TEG delay process component 1940 that is configured to receive, from a BS, information indicating a first TEG delay at the BS for a transmission of a first PRS, a second TEG delay at the BS for a reception of an SRS from the UE, a third TEG delay at the BS for a transmission of a second PRS, a fourth TEG delay at the BS for a transmission of the first PRS and a reception of the SRS from the UE, or a fifth TEG delay at the BS for a reception of the SRS from the UE and a transmission of the second PRS, or any combination thereof, e.g., as described in connection with 1702 of FIG. 17 and/or 1802 of FIG. 18. The communication manager 1932 further includes a PRS process component 1942 that is configured to receive, from the BS, the first PRS and the second PRS, e.g., as described in connection with 1704 of FIG. 17 and/or 1804 of FIG. 18. The communication manager 1932 further includes an SRS process component 1944 that is configured to transmit, to the BS, the SRS, e.g., as described in connection with 1706 of FIG. 17 and/or 1806 of FIG. 18. The communication manager 1932 further includes a BS TxRx process component 1946 that is configured to receive, from the BS, first BS time difference measurement information associated with the first PRS and the SRS, and second BS time difference measurement information associated with the second PRS and the SRS, where the double RTT may be determined further based on the received first BS time difference measurement information and the received second BS time difference measurement information, e.g., as described in connection with 1808 of FIG. 18. The communication manager 1932 further includes a double-sided RTT determination component 1948 that is configured to determine a double based on a first PRS timing associated with a reception of the first PRS, an SRS timing associated with a transmission of the SRS, a second PRS timing associated with a reception of the second PRS, and the received information, e.g., as described in connection with 1710 of FIG. 17 and/or 1810 of FIG. 18. The communication manager 1932 further includes an SRS window configuration component 1950 that is configured to receive a configuration for an SRS transmission window for transmitting the SRS, the SRS transmission window having a center approximately between the first PRS and the second PRS, where the SRS is transmitted based on the received configuration for the SRS transmission window, e.g., as described in connection with 1812 of FIG. 18.

The apparatus may include additional components that perform each of the blocks of the algorithm in the flowcharts of FIGS. 17 and 18. As such, each block in the flowcharts of FIGS. 17 and 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the cellular baseband processor 1904, includes means for receiving, from a BS, information indicating a first TEG delay at the BS for a transmission of a first PRS, a second TEG delay at the BS for a reception of an SRS from the UE, a third TEG delay at the BS for a transmission of a second PRS, a fourth TEG delay at the BS for a transmission of the first PRS and a reception of the SRS from the UE, or a fifth TEG delay at the BS for a reception of the SRS from the UE and a transmission of the second PRS, or any combination thereof (e.g., the BS TEG delay process component 1940 and/or the reception component 1930). The apparatus 1902 includes means for receiving, from the BS, the first PRS and the second PRS (e.g., the PRS process component 1942 and/or the reception component 1930). The apparatus 1902 includes means for transmitting, to the BS, the SRS (e.g., the SRS process component 1944 and/or the transmission component 1934). The apparatus 1902 includes means for receiving, from the BS, first BS time difference measurement information associated with the first PRS and the SRS, and second BS time difference measurement information associated with the second PRS and the SRS, where the double RTT may be determined further based on the received first BS time difference measurement information and the received second. BS time difference measurement information (e.g., the BS TxRx process component 1946 and/or the reception component 1930). The apparatus 1902 includes means for determining a double RTT based on a first PRS timing associated with a reception of the first PRS, an SRS timing associated with a transmission of the SRS, a second PRS timing associated with a reception of the second PRS, and the received information (e.g., the double-sided RTT determination component 1948). The apparatus 1902 includes means for receiving a configuration for an SRS transmission window for transmitting the SRS, the SRS transmission window having a center approximately between the first PRS and the second PRS, where the SRS may be transmitted based on the received configuration for the SRS transmission window (e.g., the SRS window configuration component 1950 and/or the reception component 1930).

In one configuration, the information may indicate at least one of a first BS Tx TEG ID associated with the first TEG delay, a BS Rx TEG ID associated with the second TEG delay, and a second BS Tx TEG ID associated with the third TEG delay. In such a configuration, the apparatus 1902 includes means for determining at least one of a timing error difference, a mean error, or an uncertainty of difference between the first BS Tx TEG ID and the second BS Tx TEG ID, where the double RTT may be determined further based on the at least one of the timing error difference, the mean error, or the uncertainty of difference.

In another configuration, the information may indicate a BS Tx TEG ID associated with the first TEG delay and the third TEG delay, and a BS Rx TEG ID associated with the second TEG delay.

In another configuration, the information may indicate a first BS Rx and Tx TEG ID associated with the fourth TEG delay and a second. BS Rx and Tx TEG ID associated with the fifth TEG delay. In such a configuration, the apparatus 1902 includes means for determining at least one of a timing error difference, a mean error, or an uncertainty of difference between the first BS Rx and Tx TEG ID and the second BS Rx and Tx TEG ID, where the double RTT may be determined further based on the at least one of the timing error difference, the mean error, or the uncertainty of difference.

In another configuration, the information may indicate a BS Rx and Tx TEG ID associated with both the fourth TEG delay and the fifth TEG delay.

In another configuration, the information may indicate a first BS Tx TEG ID associated with the first TEG delay, a second BS Tx TEG ID associated with the third. TEG delay, and a BS Rx and Tx TEG ID associated with the fourth TEG delay. In such a configuration, the apparatus 1902 includes means for determining at least one of a timing error difference, a mean error, or an uncertainty of difference between the first BS Tx TEG ID and the second BS Tx TEG ID, where the double RTT may be determined further based on the at least one of the timing error difference, the mean error, or the uncertainty of difference.

In another configuration, the information may indicate a BS Tx TEG ID associated with the first TEG delay and the third TEG delay, and a BS Rx and Tx TEG ID associated with the fourth TEG delay.

In another configuration, the information may indicate a first BS Tx TEG ID associated with the first TEG delay, a second BS Tx TEG ID associated with the third TEG delay, and a BS Rx and Tx TEG ID associated with the fifth TEG delay. In such a configuration, the apparatus 1902 includes means for determining at least one of a timing error difference, a mean error, or an uncertainty of difference between the first BS Tx TEG ID and the second BS Tx TEG ID, where the double RTT may be determined further based on the at least one of the timing error difference, the mean error, or the uncertainty of difference.

In another configuration, the information may indicate a BS Tx TEG ID associated with the first TEG delay and the third TEG delay, and a BS Rx and Tx TEG ID associated with the fifth TEG delay.

In another configuration, the apparatus 1902 may include means for determining first UE time difference measurement information associated with the first PRS timing and the SRS timing, and means for determining second UE time difference measurement information associated with the second PRS timing and the SRS timing. In such an example, the double RTT may be determined further based on the first UE time difference measurement information and the second UE time difference measurement information.

The means may be one or more of the components of the apparatus 1902 configured to perform the functions recited by the means. As described supra, the apparatus 1902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 20:
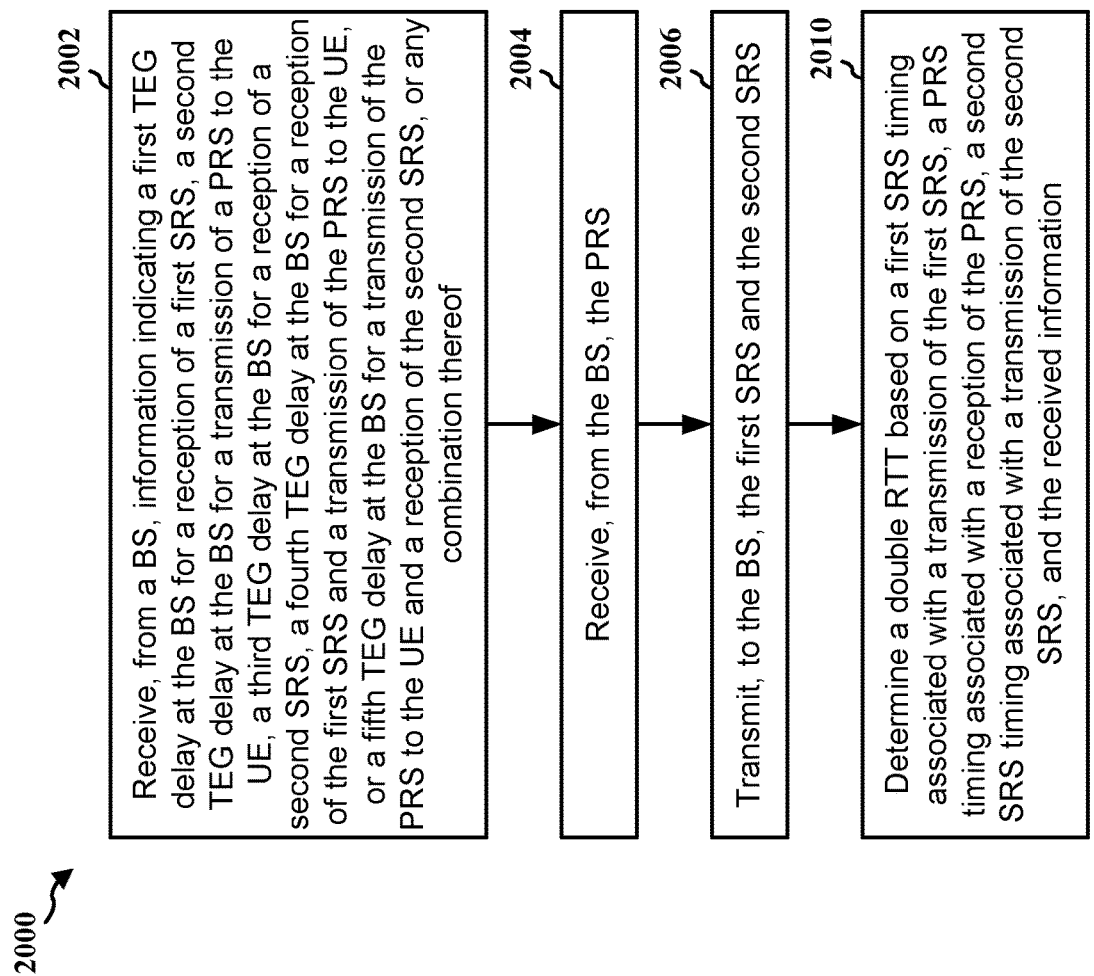
FIG. 20 is a flowchart of a method of wireless communication in accordance with aspects presented herein.

FIG. 20 is a flowchart 2000 of a method of wireless communication. The method may be performed by a UE or a component of a UE (e.g., the UE 104, 350, 704, 804, 904, 1504; the apparatus 2202; a processing system, which may include the memory 360 and which may be the entire UE 350 or a component of the UE 350, such as the TX processor 368, the RX processor 356, and/or the controller/processor 359). The method may enable the UE to perform double-sided RTT measurement more accurately by including one or more TEG delays associated with transmission and/or reception of PRS/SRS at the base station in the double-sided RTT measurement.

At 2002, the UE may receive, from a BS, information indicating a first TEG delay at the BS for a reception of a first SRS, a second TEG delay at the BS for a transmission of a PRS to the UE, a third TEG delay at the BS for a reception of a second SRS, a fourth TEG delay at the BS for a reception of the first SRS and a transmission of the PRS to the UE, or a fifth TEG delay at the BS for a transmission of the PRS to the UE and a reception of the second SRS, or any combination thereof, such as described in connection with FIG. 15. For example, at 1512, the UE 1504 may receive, from the base station 1502, the information 1514 indicating one or more TEG delay(s) (e.g., TEG ID(s) 1518, 1520, 1522, 1524, and/or 1526). The reception of the information may be performed by, e.g., the BS TEG delay process component 2240 and/or the reception component 2230 of the apparatus 2202 in FIG. 22.

In one example, the information may indicate at least one of a first BS Rx TEG ID associated with the first TEG delay, a BS Tx TEG ID associated with the second TEG delay, and a second BS Rx TEG ID associated with the third TEG delay. In such an example, the UE may determine at least one of a timing error difference, a mean error, or an uncertainty of difference between the first BS Rx TEG ID and the second BS Rx TEG ID, where the double RTT may be determined further based on the at least one of the timing error difference, the mean error, or the uncertainty of difference.

In another example, the information may indicate a BS Rx TEG ID associated with the first TEG delay and the third TEG delay, and a BS Tx TEG ID associated with the second TEG delay.

In another example, the information may indicate a first BS Rx and Tx TEG ID associated with the fourth TEG delay and a second BS Rx and Tx TEG ID associated with the fifth TEG delay. In such an example, the UE may determine at least one of a timing error difference, a mean error, or an uncertainty of difference between the first BS Rx and Tx TEG ID and the second BS Rx and Tx TEG ID, where the double RTT may be determined further based on the at least one of the timing error difference, the mean error, or the uncertainty of difference.

In another example, the information may indicate a BS Rx and Tx TEG ID associated with both the fourth TEG delay and the fifth TEG delay.

In another example, the information may indicate a first BS Rx TEG ID associated with the first TEG delay, a second BS Rx TEG ID associated with the third TEG delay, and a BS Rx and Tx TEG ID associated with the fourth TEG delay. In such an example, the UE may determine at least one of a timing error difference, a mean error, or an uncertainty of difference between the first BS Rx TEG ID and the second BS Rx TEG ID, where the double RTT may be determined further based on the at least one of the timing error difference, the mean error, or the uncertainty of difference.

In another example, the information may indicate a BS Tx TEG ID associated with the first TEG delay and the third TEG delay, and a BS Rx and Tx TEG ID associated with the fourth TEG delay.

In another example, the information may indicate a first BS Rx TEG ID associated with the first TEG delay, a second BS Rx TEG ID associated with the third TEG delay, and a BS Rx and Tx TEG ID associated with the fifth TEG delay. In such an example, the UE may determine at least one of a timing error difference, a mean error, or an uncertainty of difference between the first BS Rx TEG ID and the second BS Rx TEG ID, where the double RTT may be determined further based on the at least one of the timing error difference, the mean error, or the uncertainty of difference.

In another example, the information may indicate a BS Rx TEG ID associated with the first TEG delay and the third TEG delay, and a BS Rx and Tx TEG ID associated with the fifth TEG delay.

At 2004, the UE may receive, from the BS, the PRS, such as described in connection with FIG. 15. For example, at 1508, the UE 1504 may receive the PRS 1508 from the base station 1502. The reception of the PRS may be performed by, e.g., the PRS process component 2242 and/or the reception component 2230 of the apparatus 2202 in FIG. 22.

At 2006, the UE may transmit, to the BS, the first SRS and the second SRS, such as described in connection with FIG. 15. For example, at 1508, the UE 1504 may transmit the first SRS 1506 and the second SRS 1510 to the base station 1502. The transmission of the SRSs may be performed by, e.g., the SRS process component 2244 and/or the transmission component 2234 of the apparatus 2202 in FIG. 22.

In some examples, the UE may receive, from the BS, first BS time difference measurement information associated with the first SRS and the PRS, and second BS time difference measurement information associated with the PRS and the second SRS, where the double RTT is determined further based on the received first BS time difference measurement information and the received second BS time difference measurement information, such as described in connection with FIG. 15. For example, at 1536, the UE 1504 may receive BS Rx-Tx difference measurements from the base station 1502. The reception of the BS time difference measurements may be performed by, e.g., the BS TxRx process component 2246 and/or the reception component 2230 of the apparatus 2202 in FIG. 22.

In one example, the UE may determine first UE time difference measurement information associated with the first SRS timing and the PRS timing, and determine second UE time difference measurement information associated with the PRS timing and the second SRS timing. In such an example, the double RTT may be determined further based on the first UE time difference measurement information and the second UE time difference measurement information.

At 2010, the UE may determine a double RTT based on a first SRS timing associated with a transmission of the first SRS, a PRS timing associated with a reception of the PRS, a second SRS timing associated with a transmission of the second SRS, and the received information, such as described in connection with FIG. 15. For example, at 1538, the UE 1504 may determine double-sided RTT based on first SRS 1506, PRS 1508, second SRS 1510, BS/LTE Rx-Tx time differences, and information 1514. The determination of the double-sided RTT may be performed by, e.g., the double-sided RTT determination component 2248 of the apparatus 2202 in FIG. 22.

In some examples, the UE may receive a configuration for a first SRS transmission window for transmitting the first SRS and for a second SRS transmission window for transmitting the second SRS, the first SRS transmission window and the second SRS transmission window having a center approximately at the PRS, where the first SRS and the second SRS are transmitted based on the received configuration for the first SRS transmission window and the second SRS transmission window, such as described in connection with FIG. 16. The reception of the configuration for the SRS transmission window may be performed by, e.g., the SRS window configuration component 2250 and/or the reception component 2230 of the apparatus 2202 in FIG. 22. Each of the first SRS transmission window and the second SRS transmission window may have a width of Z, where Z may be less than or equal to a threshold.

Figure 21:
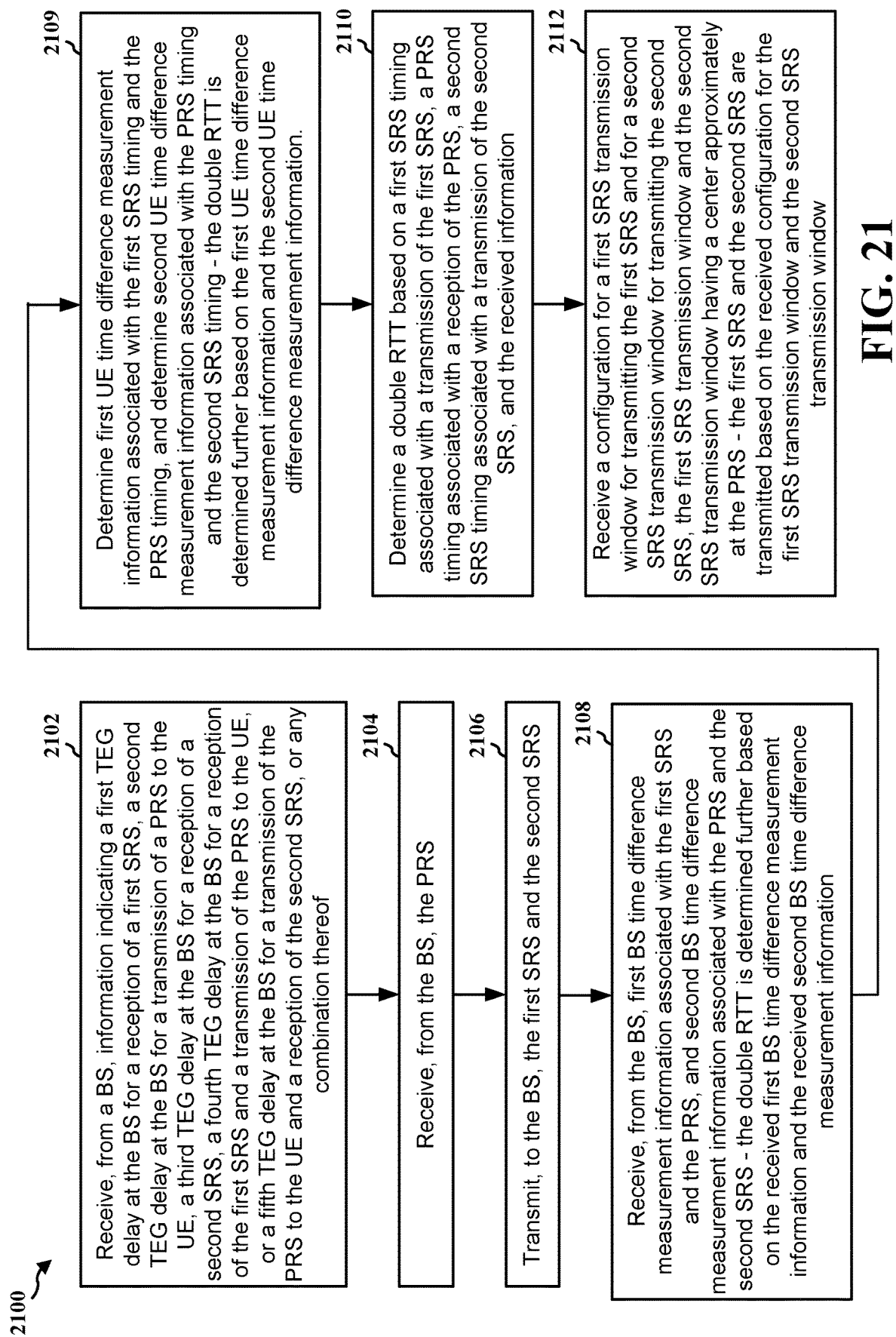
FIG. 21 is a flowchart of a method of wireless communication in accordance with aspects presented herein.

FIG. 21 is a flowchart 2100 of a method of wireless communication. The method may be performed by a UE or a component of a UE (e.g., the UE 104, 350, 704, 804, 904, 1504; the apparatus 2202; a processing system, which may include the memory 360 and which may be the entire UE 350 or a component of the UE 350, such as the TX processor 368, the RX processor 356, and/or the controller/processor 359). The method may enable the UE to perform double-sided RTT measurement more accurately by including one or more TEG delays associated with transmission and/or reception of PRS/SRS at the base station in the double-sided RTT measurement.

At 2102, the UE may receive, from a BS, information indicating a first TEG delay at the BS for a reception of a first SRS, a second TEG delay at the BS for a transmission of a PRS to the UE, a third TEG delay at the BS for a reception of a second SRS, a fourth TEG delay at the BS for a reception of the first SRS and a transmission of the PRS to the UE, or a fifth TEG delay at the BS for a transmission of the PRS to the UE and a reception of the second SRS, or any combination thereof, such as described in connection with FIG. 15. For example, at 1512, the UE 1504 may receive, from the base station 1502, the information 1514 indicating one or more TEG delay(s) (e.g., TEG ID(s) 1518, 1520, 1522, 1524, and/or 1526). The reception of the information may be performed by, e.g., the BS TEG delay process component 2240 and/or the reception component 2230 of the apparatus 2202 in FIG. 22.

In one example, the information may indicate at least one of a first BS Rx TEG ID associated with the first TEG delay, a BS Tx TEG ID associated with the second TEG delay, and a second BS Rx TEG ID associated with the third TEG delay. In such an example, the UE may determine at least one of a timing error difference, a mean error, or an uncertainty of difference between the first BS Rx TEG ID and the second BS Rx TEG ID, where the double RTT may be determined further based on the at least one of the timing error difference, the mean error, or the uncertainty of difference.

In another example, the information may indicate a BS Rx TEG ID associated with the first TEG delay and the third TEG delay, and a BS Tx TEG ID associated with the second TEG delay.

In another example, the information may indicate a first BS Rx and Tx TEG ID associated with the fourth TEG delay and a second BS Rx and Tx TEG ID associated with the fifth TEG delay. In such an example, the UE may determine at least one of a timing error difference, a mean error, or an uncertainty of difference between the first BS Rx and Tx TEG ID and the second BS Rx and Tx TEG ID, where the double RTT may be determined further based on the at least one of the timing error difference, the mean error, or the uncertainty of difference.

In another example, the information may indicate a BS Rx and Tx TEG ID associated with both the fourth TEG delay and the fifth TEG delay.

In another example, the information may indicate a first BS Rx TEG ID associated with the first TEG delay, a second BS Rx TEG ID associated with the third TEG delay, and a BS Rx and Tx TEG ID associated with the fourth TEG delay. In such an example, the UE may determine at least one of a timing error difference, a mean error, or an uncertainty of difference between the first BS Rx TEG ID and the second BS Rx TEG ID, where the double RTT may be determined further based on the at least one of the timing error difference, the mean error, or the uncertainty of difference.

In another example, the information may indicate a BS Tx TEG ID associated with the first TEG delay and the third TEG delay, and a BS Rx and Tx TEG ID associated with the fourth TEG delay.

In another example, the information may indicate a first BS Rx TEG ID associated with the first TEG delay, a second BS Rx TEG ID associated with the third TEG delay, and a BS Rx and Tx TEG ID associated with the fifth TEG delay. In such an example, the UE may determine at least one of a timing error difference, a mean error, or an uncertainty of difference between the first BS Rx TEG ID and the second BS Rx TEG ID, where the double RTT may be determined further based on the at least one of the timing error difference, the mean error, or the uncertainty of difference.

In another example, the information may indicate a BS Rx TEG ID associated with the first TEG delay and the third TEG delay, and a BS Rx and Tx TEG ID associated with the fifth TEG delay.

At 2104, the UE may receive, from the BS, the PRS, such as described in connection with FIG. 15. For example, at 1508, the UE 1504 may receive the PRS 1508 from the base station 1502. The reception of the PRS may be performed by, e.g., the PRS process component 2242 and/or the reception component 2230 of the apparatus 2202 in FIG. 22.

At 2106, the UE may transmit, to the BS, the first SRS and the second SRS, such as described in connection with FIG. 15. For example, at 1508, the UE 1504 may transmit the first SRS 1506 and the second SRS 1510 to the base station 1502. The transmission of the SRSs may be performed by, e.g., the SRS process component 2244 and/or the transmission component 2234 of the apparatus 2202 in FIG. 22.

At 2108, the HE may receive, from the BS, first BS time difference measurement information associated with the first SRS and the PRS, and second BS time difference measurement information associated with the PRS and the second SRS, where the double RTT is determined further based on the received first BS time difference measurement information and the received second BS time difference measurement information, such as described in connection with FIG. 15. For example, at 1536, the UE 1504 may receive BS Rx-Tx difference measurements from the base station 1502. The reception of the BS time difference measurements may be performed by, e.g., the BS TxRx process component 2246 and/or the reception component 2230 of the apparatus 2202 in FIG. 22.

At 2109, the UE may determine first HE time difference measurement information associated with the first SRS timing and the PRS timing, and determine second HE time difference measurement information associated with the PRS timing and the second SRS timing. In such an example, the double RTT may be determined further based on the first UE time difference measurement information and the second HE time difference measurement information.

At 2110, the UE may determine a double RTT based on a first SRS timing associated with a transmission of the first SRS, a PRS timing associated with a reception of the PRS, a second SRS timing associated with a transmission of the second SRS, and the received information, such as described in connection with FIG. 15. For example, at 1538, the HE 1504 may determine double-sided RTT based on first SRS 1506, PRS 1508, second SRS 1510, BS/UE Rx-Tx time differences, and information 1514. The determination of the double-sided RTT may be performed by, e.g., the double-sided RTT determination component 2248 of the apparatus 2202 in FIG. 22.

In some examples, as shown at 2112, the UE may receive a configuration for a first SRS transmission window for transmitting the first SRS and for a second SRS transmission window for transmitting the second SRS, the first SRS transmission window and the second SRS transmission window having a center approximately at the PRS, where the first SRS and the second SRS are transmitted based on the received configuration for the first SRS transmission window and the second SRS transmission window, such as described in connection with FIG. 16. The reception of the configuration for the SRS transmission window may be performed by, e.g., the SRS window configuration component 2250 and/or the reception component 2230 of the apparatus 2202 in FIG. 22. Each of the first SRS transmission window and the second SRS transmission window may have a width of Z, where Z may be less than or equal to a threshold.

Figure 22:
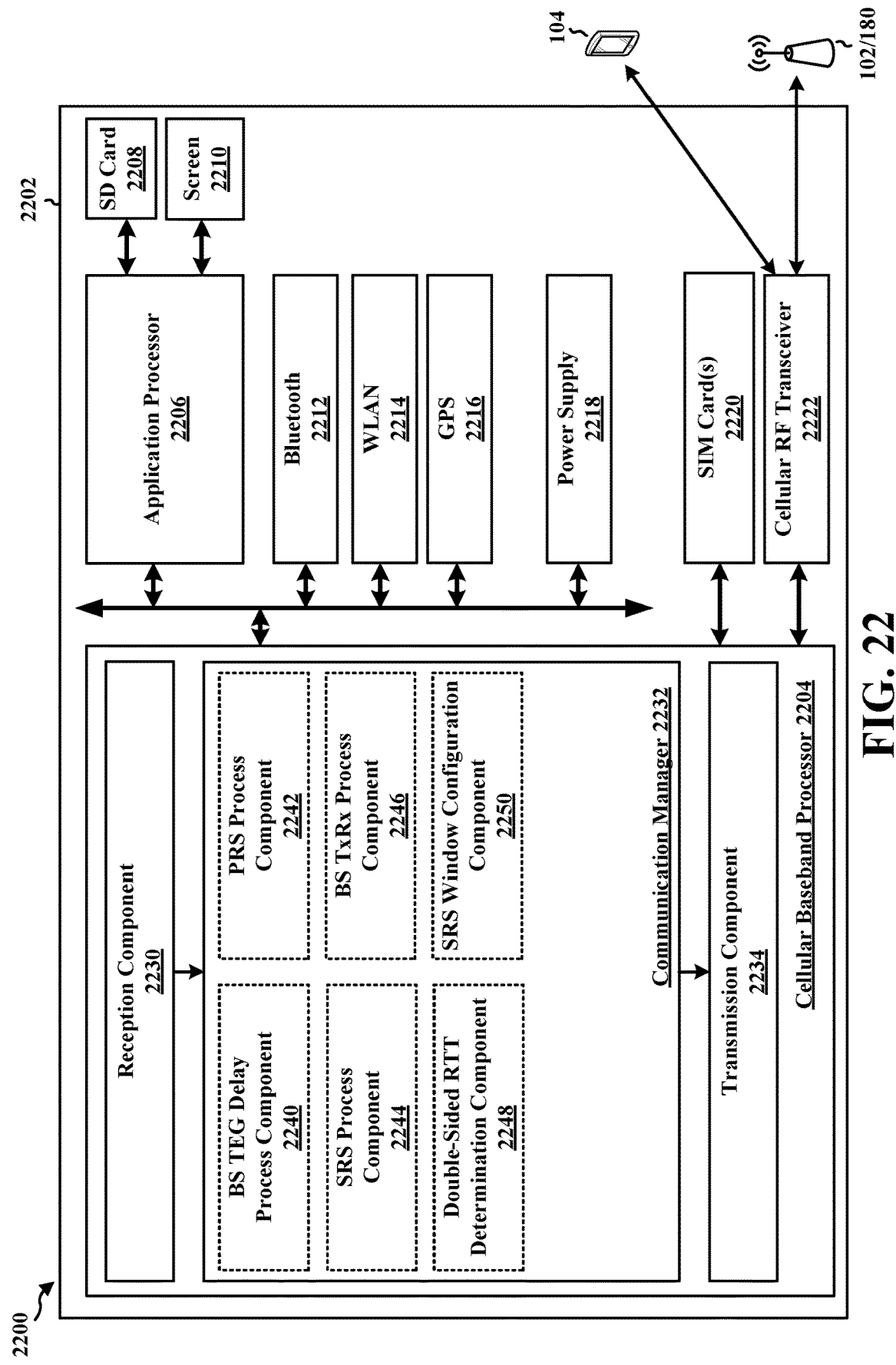
FIG. 22 is a diagram illustrating an example of a hardware implementation for an example apparatus in accordance with aspects presented herein.

FIG. 22 is a diagram 2200 illustrating an example of a hardware implementation for an apparatus 2202. The apparatus 2202 is a HE and includes a cellular baseband processor 2204 (also referred to as a modem) coupled to a cellular RF transceiver 2222 and one or more subscriber identity modules (SIM) cards 2220, an application processor 2206 coupled to a secure digital (SD) card 2208 and a screen 2210, a Bluetooth module 2212, a wireless local area network (WLAN) module 2214, a Global Positioning System (GPS) module 2216, and a power supply 2218. The cellular baseband processor 2204 communicates through the cellular RF transceiver 2222 with the LIE 104 and/or BS 102/180. The cellular baseband processor 2204 may include a computer-readable medium/memory. The computer-readable medium/memory may be non-transitory. The cellular baseband processor 2204 is responsible for general processing, including the execution of software stored on the computer-readable medium/memory. The software, when executed by the cellular baseband processor 2204, causes the cellular baseband processor 2204 to perform the various functions described supra. The computer-readable medium/memory may also be used for storing data that is manipulated by the cellular baseband processor 2204 when executing software. The cellular baseband processor 2204 further includes a reception component 2230, a communication manager 2232, and a transmission component 2234. The communication manager 2232 includes the one or more illustrated components. The components within the communication manager 2232 may be stored in the computer-readable medium/memory and/or configured as hardware within the cellular baseband processor 2204. The cellular baseband processor 2204 may be a component of the UE 350 and may include the memory 360 and/or at least one of the TX processor 368, the RX processor 356, and the controller/processor 359. In one configuration, the apparatus 2202 may be a modem chip and include just the baseband processor 2204, and in another configuration, the apparatus 2202 may be the entire UE (e.g., see 350 of FIG. 3) and include the aforediscussed additional modules of the apparatus 2202.

The communication manager 2232 includes a BS TEG delay process component 2240 that is configured to receive, from a BS, information indicating a first TEG delay at the BS for a reception of a first SRS, a second TEG delay at the BS for a transmission of a PRS to the UE, a third TEG delay at the BS for a reception of a second SRS, a fourth TEG delay at the BS for a reception of the first SRS and a transmission of the PRS to the UE, or a fifth TEG delay at the BS for a transmission of the PRS to the UE and a reception of the second SRS, or any combination thereof, e.g., as described in connection with 2002 of FIG. 20 and/or 2102 of FIG. 21. The communication manager 2232 further includes a PRS process component 2242 that is configured to receive, from the BS, the PRS, e.g., as described in connection with 2004 of FIG. 20 and/or 2104 of FIG. 21. The communication manager 2232 further includes an SRS process component 2244 that is configured to transmit, to the BS, the first SRS and the second SRS, e.g., as described in connection with 2006 of FIG. 20 and/or 2106 of FIG. 21. The communication manager 2232 further includes a BS TxRx process component 2246 that is configured to receive, from the BS, first BS time difference measurement information associated with the first SRS and the PRS, and second BS time difference measurement information associated with the PRS and the second SRS, where the double RTT is determined further based on the received first BS time difference measurement information and the received second BS time difference measurement information, e.g., as described in connection with 2108 of FIG. 21. The communication manager 2232 further includes a double-sided RTT determination component 2248 that is configured to determine a double RTT based on a first SRS timing associated with a transmission of the first SRS, a PRS timing associated with a reception of the PRS, a second SRS timing associated with a transmission of the second SRS, and the received information, e.g., as described in connection with 2010 of FIG. 20 and/or 2110 of FIG. 21. The communication manager 2232 further includes an SRS window configuration component 2250 that is configured to receive a configuration for a first SRS transmission window for transmitting the first SRS and for a second SRS transmission window for transmitting the second SRS, the first SRS transmission window and the second SRS transmission window having a center approximately at the PRS, where the first SRS and the second SRS are transmitted based on the received configuration for the first SRS transmission window and the second SRS transmission window, e.g., as described in connection with 2112 of FIG. 21.

The apparatus may include additional components that perform each of the blocks of the algorithm in the flowcharts of FIGS. 20 and 21. As such, each block in the flowcharts of FIGS. 20 and 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2202, and in particular the cellular baseband processor 2204, includes means for receiving, from a BS, information indicating a first TEG delay at the BS for a reception of a first SRS, a second TEG delay at the BS for a transmission of a PRS to the UE, a third TEG delay at the BS for a reception of a second SRS, a fourth TEG delay at the BS for a reception of the first SRS and a transmission of the PRS to the UE, or a fifth TEG delay at the BS for a transmission of the PRS to the UE and a reception of the second SRS, or any combination thereof (e.g., the BS TEG delay process component 2240 and/or the reception component 2230). The apparatus 2202 includes means for receiving, from the BS, the PRS (e.g., the PRS process component 2242 and/or the reception component 2230). The apparatus 2202 includes means for transmitting, to the BS, the first SRS and the second SRS (e.g., the SRS process component 2244 and/or the transmission component 2234). The apparatus 2202 includes means for receiving, from the BS, first BS time difference measurement information associated with the first SRS and the PRS, and second BS time difference measurement information associated with the PRS and the second SRS, where the double RTT is determined further based on the received first BS time difference measurement information and the received second BS time difference measurement information (e.g., the BS TxRx process component 2246 and/or the reception component 2230). The apparatus 2202 includes means for determining a double RTT based on a first SRS timing associated with a transmission of the first SRS, a PRS timing associated with a reception of the PRS, a second SRS timing associated with a transmission of the second SRS, and the received information (e.g., the double-sided RTT determination component 2248). The apparatus 2202 includes means for receiving a configuration for a first SRS transmission window for transmitting the first SRS and for a second SRS transmission window for transmitting the second SRS, the first SRS transmission window and the second SRS transmission window having a center approximately at the PRS, where the first SRS and the second SRS are transmitted based on the received configuration for the first SRS transmission window and the second SRS transmission window (e.g., the SRS window configuration component 2250 and/or the reception component 2230).

In one configuration, the information may indicate at least one of a first BS Rx TEG ID associated with the first TEG delay, a BS Tx TEG ID associated with the second TEG delay, and a second BS Rx TEG ID associated with the third TEG delay. In such a configuration, the apparatus 2202 includes means for determining at least one of a timing error difference, a mean error, or an uncertainty of difference between the first BS Rx TEG ID and the second BS Rx TEG ID, where the double RTT may be determined further based on the at least one of the timing error difference, the mean error, or the uncertainty of difference.

In another configuration, the information may indicate a BS Rx TEG ID associated with the first TEG delay and the third TEG delay, and a BS Tx TEG ID associated with the second TEG delay.

In another configuration, the information may indicate a first BS Rx and Tx TEG ID associated with the fourth TEG delay and a second. BS Rx and Tx TEG ID associated with the fifth TEG delay. In such a configuration, the apparatus 2202 includes means for determining at least one of a timing error difference, a mean error, or an uncertainty of difference between the first BS Rx and Tx TEG ID and the second BS Rx and Tx TEG ID, where the double RTT may be determined further based on the at least one of the timing error difference, the mean error, or the uncertainty of difference.

In another configuration, the information may indicate a BS Rx and Tx TEG ID associated with both the fourth TEG delay and the fifth TEG delay.

In another configuration, the information may indicate a first BS Rx TEG ID associated with the first TEG delay, a second BS Rx TEG ID associated with the third TEG delay, and a BS Rx and Tx TEG ID associated with the fourth TEG delay. In such a configuration, the apparatus 2202 includes means for determining at least one of a timing error difference, a mean error, or an uncertainty of difference between the first BS Rx TEG ID and the second BS Rx TEG ID, where the double RTT may be determined further based on the at least one of the timing error difference, the mean error, or the uncertainty of difference.

In another configuration, the information may indicate a BS Tx TEG ID associated with the first TEG delay and the third TEG delay, and a BS Rx and Tx TEG ID associated with the fourth TEG delay.

In another configuration, the information may indicate a first BS Rx TEG ID associated with the first TEG delay, a second BS Rx TEG ID associated with the third TEG delay, and a BS Rx and Tx TEG ID associated with the fifth TEG delay. In such a configuration, the apparatus 2202 includes means for determining at least one of a timing error difference, a mean error, or an uncertainty of difference between the first BS Rx TEG ID and the second BS Rx TEG ID, where the double RTT may be determined further based on the at least one of the timing error difference, the mean error, or the uncertainty of difference.

In another configuration, the information may indicate a BS Rx TEG ID associated with the first TEG delay and the third TEG delay, and a BS Rx and Tx TEG ID associated with the fifth TEG delay.

In another configuration, the apparatus 2202 includes means for determining first UE time difference measurement information associated with the first SRS timing and the PRS timing, and means for determining second UE time difference measurement information associated with the PRS timing and the second SRS timing. In such a configuration, the double WIT may be determined further based on the first UE time difference measurement information and the second UE time difference measurement information.

The means may be one or more of the components of the apparatus 2202 configured to perform the functions recited by the means. As described supra, the apparatus 2202 may include the TX Processor 368, the RX Processor 356, and the controller/processor 359. As such, in one configuration, the means may be the TX Processor 368, the RX Processor 356, and the controller/processor 359 configured to perform the functions recited by the means.

The following examples set forth additional aspects and are illustrative only and aspects thereof may be combined with aspects of other embodiments or teaching described herein, without limitation.

Aspect 1 is a method of wireless communication at a UE, including: receiving, from a BS, information indicating a first TEG delay at the BS for a transmission of a first PRS, a second TEG delay at the BS for a reception of an SRS from the UE, a third TEG delay at the BS for a transmission of a second PRS, a fourth TEG delay at the BS for a transmission of the first PRS and a reception of the SRS from the UE, or a fifth TEG delay at the BS for a reception of the SRS from the UE and a transmission of the second PRS, or any combination thereof; receiving, from the BS, the first PRS and the second PRS; transmitting, to the BS, the SRS; and determining a double RTT based on a first PRS timing associated with a reception of the first PRS, an SRS timing associated with a transmission of the SRS, a second PRS timing associated with a reception of the second PRS, and the received information.

In aspect 2, the method of aspect 1 further includes that the information indicates at least one of a first BS Tx TEG ID associated with the first TEG delay, a BS Rx TEG ID associated with the second TEG delay, and a second BS Tx TEG ID associated with the third TEG delay.

In aspect 3, the method of aspect 1 or aspect 2 further includes determining at least one of a timing error difference, a mean error, or an uncertainty of difference between the first BS Tx TEG ID and the second BS Tx TEG ID, where the double RTT is determined further based on the at least one of the tinting error difference, the mean error, or the uncertainty of difference.

In aspect 4, the method of any of aspects 1-3 further includes that the information indicates a BS Tx TEG ID associated with the first TEG delay and the third TEG delay, and a BS Rx TEG ID associated with the second TEG delay.

In aspect 5, the method of any of aspects 1-4 further includes that the information indicates a first BS Rx and Tx TEG ID associated with the fourth TEG delay and a second BS Rx and Tx TEG ID associated with the fifth TEG delay.

In aspect 6, the method of any of aspects 1-5 further includes determining at least one of a timing error difference, a mean error, or an uncertainty of difference between the first BS Rx and Tx TEG ID and the second BS Rx and Tx TEG ID, where the double RTT is determined further based on the at least one of the timing error difference, the mean error, or the uncertainty of difference.

In aspect 7, the method of any of aspects 1-6 further includes that the information indicates a BS Rx and Tx TEG ID associated with both the fourth TEG delay and the fifth TEG delay.

In aspect 8, the method of any of aspects 1-7 further includes that the information indicates a first BS Tx TEG ID associated with the first TEG delay, a second BS Tx TEG ID associated with the third TEG delay, and a BS Rx and Tx TEG ID associated with the fourth TEG delay.

In aspect 9, the method of any of aspects 1-8 further includes determining at least one of a timing error difference, a mean error, or an uncertainty of difference between the first BS Tx TEG ID and the second BS Tx TEG ID, where the double RTT is determined further based on the at least one of the timing error difference, the mean error, or the uncertainty of difference.

In aspect 10, the method of any of aspects 1-9 further includes that the information indicates a BS Tx TEG ID associated with the first TEG delay and the third TEG delay, and a BS Rx and Tx TEG ID associated with the fourth TEG delay.

In aspect 11, the method of any of aspects 1-10 further includes that the information indicates a first BS Tx TEG ID associated with the first TEG delay, a second BS Tx TEG ID associated with the third TEG delay, and a BS Rx and Tx TEG ID associated with the fifth TEG delay.

In aspect 12, the method of any of aspects 1-11 further includes determining at least one of a timing error difference, a mean error, or an uncertainty of difference between the first BS Tx TEG ID and the second BS Tx TEG ID, where the double RTT is determined further based on the at least one of the timing error difference, the mean error, or the uncertainty of difference.

In aspect 13, the method of any of aspects 1-12 further includes that the information indicates a BS Tx TEG ID associated with the first TEG delay and the third TEG delay, and a BS Rx and Tx TEG ID associated with the fifth TEG delay.

In aspect 14, the method of any of aspects 1-13 further includes receiving a configuration for an SRS transmission window for transmitting the SRS, the SRS transmission window having a center approximately between the first PRS and the second PRS, where the SRS is transmitted based on the received configuration for the SRS transmission window.

In aspect 15, the method of any of aspects 1-14 further includes that the SRS transmission window has a width of Z, where Z is less than or equal to a threshold.

In aspect 16, the method of any of aspects 1-15 further includes receiving, from the BS, first BS time difference measurement information associated with the first PRS and the SRS, and second BS time difference measurement information associated with the second PRS and the SRS, where the double RTT is determined further based on the received first BS time difference measurement information and the received second BS time difference measurement information.

In aspect 17, the method of any of aspects 1-16 further includes determining first UE time difference measurement information associated with the first PRS timing and the SRS timing; and determining second UE time difference measurement information associated with the second PRS timing and the SRS timing, where the double RTT is determined further based on the first UE time difference measurement information and the second UE time difference measurement information.

Aspect 18 is an apparatus for wireless communication including at least one processor coupled to a memory and configured to implement a method as in any of aspects 1 to 17.

Aspect 19 is an apparatus for wireless communication including means for implementing a method as in any of aspects 1 to 17.

Aspect 20 is a non-transitory computer-readable medium storing computer executable code, where the code when executed by a processor causes the processor to implement a method as in any of aspects 1 to 17.

Aspect 21 is a method of wireless communication at a UE, including: receiving, from a BS, information indicating a first TEG delay at the BS for a reception of a first SRS, a second TEG delay at the BS for a transmission of a PRS to the HE, a third TEG delay at the BS for a reception of a second SRS, a fourth TEG delay at the BS for a reception of the first SRS and a transmission of the PRS to the UE, or a fifth TEG delay at the BS for a transmission of the PRS to the UE and a reception of the second SRS, or any combination thereof; receiving, from the BS, the PRS; transmitting, to the BS, the first SRS and the second SRS; and determining a double RTT based on a first SRS timing associated with a transmission of the first SRS, a PRS timing associated with a reception of the PRS, a second SRS timing associated with a transmission of the second SRS, and the received information.

In aspect 22, the method of aspect 21 further includes that the information indicates at least one of a first BS Rx TEG ID associated with the first TEG delay, a BS Tx TEG ID associated with the second TEG delay, and a second. BS Rx TEG ID associated with the third TEG delay.

In aspect 23, the method of aspect 21 or aspect 22 further includes deter mining at least one of a timing error difference, a mean error, or an uncertainty of difference between the first BS Rx TEG ID and the second BS Rx TEG ID, where the double RTT is determined further based on the at least one of the timing error difference, the mean error, or the uncertainty of difference.

In aspect 24, the method of any of aspects 21-23 further includes that the information indicates a BS Rx TEG ID associated with the first TEG delay and the third TEG delay, and a BS Tx TEG ID associated with the second TEG delay.

In aspect 25, the method of any of aspects 21-24 further includes that the information indicates a first BS Rx and Tx TEG ID associated with the fourth TEG delay and a second BS Rx and Tx TEG ID associated with the fifth TEG delay.

In aspect 26, the method of any of aspects 21-25 further includes determining at least one of a timing error difference, a mean error, or an uncertainty of difference between the first BS Rx and Tx TEG ID and the second BS Rx and Tx TEG ID, where the double RTT is determined further based on the at least one of the timing error difference, the mean error, or the uncertainty of difference.

In aspect 27, the method of any of aspects 21-26 further includes that the information indicates a BS Rx and Tx TEG ID associated with both the fourth TEG delay and the fifth TEG delay.

In aspect 28, the method of any of aspects 21-27 further includes that the information indicates a first BS Rx TEG ID associated with the first TEG delay, a second. BS Rx TEG ID associated with the third TEG delay, and a BS Rx and Tx TEG ID associated with the fourth TEG delay.

In aspect 29, the method of any of aspects 21-28 further includes determining at least one of a timing error difference, a mean error, or an uncertainty of difference between the first BS Rx TEG ID and the second BS Rx TEG ID, where the double RTT is determined further based on the at least one of the timing error difference, the mean error, or the uncertainty of difference.

In aspect 30, the method of any of aspects 21-29 further includes that the information indicates a BS Tx TEG ID associated with the first TEG delay and the third TEG delay, and a BS Rx and Tx TEG ID associated with the fourth TEG delay.

In aspect 31, the method of any of aspects 21-30 further includes that the information indicates a first BS Rx TEG ID associated with the first TEG delay, a second BS Rx TEG ID associated with the third TEG delay, and a BS Rx and Tx TEG ID associated with the fifth TEG delay.

In aspect 32, the method of any of aspects 21-31 further includes determining at least one of a timing error difference, a mean error, or an uncertainty of difference between the first BS Rx TEG ID and the second BS Rx TEG ID, where the double RTT is determined further based on the at least one of the timing error difference, the mean error, or the uncertainty of difference.

In aspect 33, the method of any of aspects 21-32 further includes that the information indicates a BS Rx TEG ID associated with the first TEG delay and the third TEG delay, and a BS Rx and Tx TEG ID associated with the fifth TEG delay.

In aspect 34, the method of any of aspects 21-33 further includes receiving a configuration for a first SRS transmission window for transmitting the first SRS and for a second SRS transmission window for transmitting the second SRS, the first SRS transmission window and the second SRS transmission window having a center approximately at the PRS, where the first SRS and the second SRS are transmitted based on the received configuration for the first SRS transmission window and the second SRS transmission window.

In aspect 35, the method of any of aspects 21-34 further includes that each of the first SRS transmission window and the second SRS transmission window has a width of Z, where Z is less than or equal to a threshold.

In aspect 36, the method of any of aspects 21-35 further includes receiving, from the BS, first BS time difference measurement information associated with the first SRS and the PRS, and second BS time difference measurement information associated with the PRS and the second SRS, where the double RTT is determined further based on the received first BS time difference measurement information and the received second BS time difference measurement information.

In aspect 37, the method of any of aspects 21-36 further includes determining first UE time difference measurement information associated with the first SRS timing and the PRS timing; and determining second UE time difference measurement information associated with the PRS timing and the second SRS timing, where the double RTT is determined further based on the first UE time difference measurement information and the second UE time difference measurement information.

Aspect 38 is an apparatus for wireless communication including at least one processor coupled to a memory and configured to implement a method as in any of aspects 21 to 37.

Aspect 39 is an apparatus for wireless communication including means for implementing a method as in any of aspects 21 to 37.

Aspect 40 is a non-transitory computer-readable medium storing computer executable code, where the code when executed by a processor causes the processor to implement a method as in any of aspects 21 to 37.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
    a memory;
    a transceiver; and
    a processor, communicatively connected to the memory and the transceiver, the processor configured to:
        receive, from a base station (BS), information indicating a first timing error group (TEG) delay at the BS for a transmission of a first positioning reference signal (PRS), a second TEG delay at the BS for a reception of a sounding reference signal (SRS) from the UE, a third TEG delay at the BS for a transmission of a second PRS, a fourth TEG delay at the BS for a transmission of the first PRS and a reception of the SRS from the UE, or a fifth TEG delay at the BS for a reception of the SRS from the UE and a transmission of the second PRS, or any combination thereof;
        receive, from the BS, the first PRS and the second PRS;
        transmit, to the BS, the SRS; and
        determine a double round trip time (RTT) based on a first PRS timing associated with a reception of the first PRS, an SRS timing associated with a transmission of the SRS, a second PRS timing associated with a reception of the second PRS, and the received information.

2. The apparatus of claim 1, wherein the information indicates at least one of a first BS transmission (Tx) TEG identifier (ID) associated with the first TEG delay, a BS reception (Rx) TEG ID associated with the second TEG delay, and a second BS Tx TEG ID associated with the third TEG delay.

3. The apparatus of claim 2, wherein the processor is further configured to determine at least one of a timing error difference, a mean error, or an uncertainty of difference between the first BS Tx TEG ID and the second BS Tx TEG ID, wherein the double RTT is determined further based on the at least one of the timing error difference, the mean error, or the uncertainty of difference.

4. The apparatus of claim 1, wherein the information indicates a first BS reception (Rx) and transmission (Tx) TEG identifier (ID) associated with the fourth TEG delay and a second BS Rx and Tx TEG ID associated with the fifth TEG delay.

5. The apparatus of claim 4, wherein the processor is further configured to determine at least one of a timing error difference, a mean error, or an uncertainty of difference between the first BS Rx and Tx TEG ID and the second BS Rx and Tx TEG ID, wherein the double RTT is determined further based on the at least one of the timing error difference, the mean error, or the uncertainty of difference.

6. The apparatus of claim 1, wherein the processor is further configured to receive a configuration for an SRS transmission window for transmitting the SRS, the SRS transmission window having a center approximately between the first PRS and the second PRS, wherein the SRS is transmitted based on the received configuration for the SRS transmission window, wherein the SRS transmission window has a width of Z, where Z is less than or equal to a threshold.

7. The apparatus of claim 1, wherein the processor is further configured to receive, from the BS, first BS time difference measurement information associated with the first PRS and the SRS, and second BS time difference measurement information associated with the second PRS and the SRS, wherein the double RTT is determined further based on the received first BS time difference measurement information and the received second BS time difference measurement information.

8. The apparatus of claim 7, wherein the processor is further configured to:
determine first UE time difference measurement information associated with the first PRS timing and the SRS timing; and
determine second UE time difference measurement information associated with the second PRS timing and the SRS timing,
wherein the double RTT is determined further based on the first UE time difference measurement information and the second UE time difference measurement information.

9. A method of wireless communication at a user equipment (UE), comprising:
receiving, from a base station (BS), information indicating a first timing error group (TEG) delay at the BS for a transmission of a first positioning reference signal (PRS), a second TEG delay at the BS for a reception of a sounding reference signal (SRS) from the UE, a third TEG delay at the BS for a transmission of a second PRS, a fourth TEG delay at the BS for a transmission of the first PRS and a reception of the SRS from the UE, or a fifth TEG delay at the BS for a reception of the SRS from the UE and a transmission of the second PRS, or any combination thereof;
receiving, from the BS, the first PRS and the second PRS;
transmitting, to the BS, the SRS; and
determining a double round trip time (RTT) based on a first PRS timing associated with a reception of the first PRS, an SRS timing associated with a transmission of the SRS, a second PRS timing associated with a reception of the second PRS, and the received information.

10. The method of claim 9, wherein the information indicates at least one of a first BS transmission (Tx) TEG identifier (ID) associated with the first TEG delay, a BS reception (Rx) TEG ID associated with the second TEG delay, and a second BS Tx TEG ID associated with the third TEG delay.

11. The method of claim 10, further comprising determining at least one of a timing error difference, a mean error, or an uncertainty of difference between the first BS Tx TEG ID and the second BS Tx TEG ID, wherein the double RTT is determined further based on the at least one of the timing error difference, the mean error, or the uncertainty of difference.

12. The method of claim 9, wherein the information indicates a first BS reception (Rx) and transmission (Tx) TEG identifier (ID) associated with the fourth TEG delay and a second BS Rx and Tx TEG ID associated with the fifth TEG delay.

13. The method of claim 12, further comprising determining at least one of a timing error difference, a mean error, or an uncertainty of difference between the first BS Rx and Tx TEG ID and the second BS Rx and Tx TEG ID, wherein the double RTT is determined further based on the at least one of the timing error difference, the mean error, or the uncertainty of difference.

14. The method of claim 9, further comprising receiving a configuration for an SRS transmission window for transmitting the SRS, the SRS transmission window having a center approximately between the first PRS and the second PRS, wherein the SRS is transmitted based on the received configuration for the SRS transmission window, wherein the SRS transmission window has a width of Z, where Z is less than or equal to a threshold.

15. The method of claim 9, further comprising receiving, from the BS, first BS time difference measurement information associated with the first PRS and the SRS, and second BS time difference measurement information associated with the second PRS and the SRS, wherein the double RTT is determined further based on the received first BS time difference measurement information and the received second BS time difference measurement information.

16. An apparatus for wireless communication at a user equipment (UE), comprising:
a memory;
a transceiver; and
a processor, communicatively connected to the memory and the transceiver, the processor configured to:
receive, from a base station (BS), information indicating a first timing error group (TEG) delay at the BS for a reception of a first sounding reference signal (SRS), a second TEG delay at the BS for a transmission of a positioning reference signal (PRS) to the UE, a third TEG delay at the BS for a reception of a second SRS, a fourth TEG delay at the BS for a reception of the first SRS and a transmission of the PRS to the UE, or a fifth TEG delay at the BS for a transmission of the PRS to the UE and a reception of the second SRS, or any combination thereof,
receive, from the BS, the PRS;
transmit, to the BS, the first SRS and the second SRS; and determine a double round trip time (RTT) based on a first SRS timing associated with a transmission of the first SRS, a PRS timing associated with a reception of the PRS, a second SRS timing associated with a transmission of the second SRS, and the received information.

17. The apparatus of claim 16, wherein the information indicates at least one of a first BS reception (Rx) TEG identifier (ID) associated with the first TEG delay, a BS transmission (Tx) TEG ID associated with the second TEG delay, and a second BS Rx TEG ID associated with the third TEG delay.

18. The apparatus of claim 17, wherein the processor is further configured to determine at least one of a timing error difference, a mean error, or an uncertainty of difference between the first BS Rx TEG ID and the second BS Rx TEG ID, wherein the double RTT is determined further based on the at least one of the timing error difference, the mean error, or the uncertainty of difference.

19. The apparatus of claim 16, wherein the information indicates a first BS reception (Rx) and transmission (Tx) TEG identifier (ID) associated with the fourth TEG delay and a second BS Rx and Tx TEG ID associated with the fifth TEG delay.

20. The apparatus of claim 19, wherein the processor is further configured to determine at least one of a timing error difference, a mean error, or an uncertainty of difference between the first BS Rx and Tx TEG ID and the second BS Rx and Tx TEG ID, wherein the double RTT is determined further based on the at least one of the timing error difference, the mean error, or the uncertainty of difference.

21. The apparatus of claim 16, wherein the processor is further configured to receive a configuration for a first SRS transmission window for transmitting the first SRS and for a second SRS transmission window for transmitting the second SRS, the first SRS transmission window and the second SRS transmission window having a center approximately at the PRS, wherein the first SRS and the second SRS are transmitted based on the received configuration for the first SRS transmission window and the second SRS transmission window, wherein each of the first SRS transmission window and the second SRS transmission window has a width of Z, where Z is less than or equal to a threshold.

22. The apparatus of claim 16, wherein the processor is further configured to receive, from the BS, first BS time difference measurement information associated with the first SRS and the PRS, and second BS time difference measurement information associated with the PRS and the second SRS, wherein the double RTT is determined further based on the received first BS time difference measurement information and the received second BS time difference measurement information.

23. The apparatus of claim 22, wherein the processor is further configured to:
determine first UE time difference measurement information associated with the first SRS timing and the PRS timing; and
determine second UE time difference measurement information associated with the PRS timing and the second SRS timing,
wherein the double RTT is determined further based on the first UE time difference measurement information and the second UE time difference measurement information.

24. A method of wireless communication at a user equipment (UE), comprising:
receiving, from a base station (BS), information indicating a first timing error group (TEG) delay at the BS for a reception of a first sounding reference signal (SRS), a second TEG delay at the BS for a transmission of a positioning reference signal (PRS) to the UE, a third TEG delay at the BS for a reception of a second SRS, a fourth TEG delay at the BS for a reception of the first SRS and a transmission of the PRS to the UE, or a fifth TEG delay at the BS for a transmission of the PRS to the UE and a reception of the second SRS, or any combination thereof;
receiving, from the BS, the PRS;
transmitting, to the BS, the first SRS and the second SRS; and
determining a double round trip time (RTT) based on a first SRS timing associated with a transmission of the first SRS, a PRS timing associated with a reception of the PRS, a second SRS timing associated with a transmission of the second SRS, and the received information.

25. The method of claim 24, wherein the information indicates at least one of a first BS reception (Rx) TEG identifier (ID) associated with the first TEG delay, a BS transmission (Tx) TEG ID associated with the second TEG delay, and a second BS Rx TEG ID associated with the third TEG delay.

26. The method of claim 25, further comprising determining at least one of a timing error difference, a mean error, or an uncertainty of difference between the first BS Rx TEG ID and the second BS Rx TEG ID, wherein the double RTT is determined further based on the at least one of the timing error difference, the mean error, or the uncertainty of difference.

27. The method of claim 24, wherein the information indicates a first BS reception (Rx) and transmission (Tx) TEG identifier (ID) associated with the fourth TEG delay and a second BS Rx and Tx TEG ID associated with the fifth TEG delay.

28. The method of claim 27, further comprising determining at least one of a timing error difference, a mean error, or an uncertainty of difference between the first BS Rx and Tx TEG ID and the second BS Rx and Tx TEG ID, wherein the double RTT is determined further based on the at least one of the timing error difference, the mean error, or the uncertainty of difference.

29. The method of claim 24, further comprising receiving a configuration for a first SRS transmission window for transmitting the first SRS and for a second SRS transmission window for transmitting the second SRS, the first SRS transmission window and the second SRS transmission window having a center approximately at the PRS, wherein the first SRS and the second SRS are transmitted based on the received configuration for the first SRS transmission window and the second SRS transmission window, wherein each of the first SRS transmission window and the second SRS transmission window has a width of Z, where Z is less than or equal to a threshold.

30. The method of claim 24, further comprising receiving, from the BS, first BS time difference measurement information associated with the first SRS and the PRS, and second BS time difference measurement information associated with the PRS and the second SRS, wherein the double RTT is determined further based on the received first BS time difference measurement information and the received second BS time difference measurement information.

* * * * *